United States Patent
Hwang et al.

(10) Patent No.: US 10,743,351 B2
(45) Date of Patent: Aug. 11, 2020

(54) METHOD AND WIRELESS DEVICE FOR TRANSMITTING RANDOM-ACCESS PREAMBLE BY MEANS OF SINGLE-TONE METHOD

(71) Applicant: LG ELECTRONICS INC., Seoul (KR)

(72) Inventors: Daesung Hwang, Seoul (KR); Yunjung Yi, Seoul (KR); Bonghoe Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/061,644

(22) PCT Filed: Nov. 29, 2016

(86) PCT No.: PCT/KR2016/013838
§ 371 (c)(1),
(2) Date: Jun. 12, 2018

(87) PCT Pub. No.: WO2017/105005
PCT Pub. Date: Jun. 22, 2017

(65) Prior Publication Data
US 2019/0274168 A1 Sep. 5, 2019

Related U.S. Application Data

(60) Provisional application No. 62/269,102, filed on Dec. 18, 2015, provisional application No. 62/277,006, (Continued)

(51) Int. Cl.
*H04W 74/00* (2009.01)
*H04L 1/18* (2006.01)
(Continued)

(52) U.S. Cl.
CPC ....... *H04W 74/0833* (2013.01); *H04L 5/0012* (2013.01); *H04L 5/0053* (2013.01);
(Continued)

(58) Field of Classification Search
CPC .......... H04W 74/0833; H04W 74/004; H04L 27/2602; H04L 5/0012; H04L 5/0053;
(Continued)

(56) References Cited

U.S. PATENT DOCUMENTS 8,582,673 B2 * 11/2013 Hao .................. H04W 74/0866
370/330
10,090,880 B2 * 10/2018 Wang .................. H04B 1/7143
(Continued)

FOREIGN PATENT DOCUMENTS

| WO | 2008016248 | 2/2008 |
|---|---|---|
| WO | 2014190537 | 12/2014 |

OTHER PUBLICATIONS

PCT International Application No. PCT/KR2016/013838, Written Opinion of the International Searching Authority dated Feb. 23, 2017, 4 pages.
(Continued)

*Primary Examiner* — Edan Orgad
*Assistant Examiner* — Vanneilian Lalchinthang
(74) *Attorney, Agent, or Firm* — Lee Hong Degerman Kang & Waimey

(57) ABSTRACT

Disclosed is a method for a wireless device for transmitting a random-access preamble. The method may comprise the steps of: generating a sequence of a random-access preamble; and mapping the sequence of a random-access preamble to one sub-carrier wave from among 12 sub-carrier waves of a frequency domain. The mapping step may comprise the step for carrying out a first hop between a plurality of sub-regions. Each sub-region may comprise a previously set number of sub-carrier waves. The mapping step may additionally comprise the step for carrying out a second hop from among the sub-carrier waves within any one sub-region.

15 Claims, 24 Drawing Sheets

Related U.S. Application Data filed on Jan. 11, 2016, provisional application No. 62/288,400, filed on Jan. 28, 2016, provisional application No. 62/306,600, filed on Mar. 10, 2016.

(51) Int. Cl.
  *H04W 74/08* (2009.01)
  *H04L 5/00* (2006.01)
  *H04L 27/26* (2006.01)

(52) U.S. Cl.
  CPC ....... *H04L 27/2602* (2013.01); *H04W 74/004* (2013.01); *H04W 74/006* (2013.01)

(58) Field of Classification Search
  CPC ................. H04L 1/1861; H04L 1/1854; H04L 29/08306; H04L 27/2613; H04B 7/26
  USPC .......................................................... 370/329
  See application file for complete search history.

(56) References Cited

U.S. PATENT DOCUMENTS

| | | | | |
|---|---|---|---|---|
| 2015/0223086 | A1* | 8/2015 | Kim | H04B 17/309 |
| | | | | 370/252 |
| 2015/0319779 | A1* | 11/2015 | Li | H04L 27/2613 |
| | | | | 370/329 |
| 2016/0198508 | A1* | 7/2016 | Lee | H04W 72/02 |
| | | | | 370/329 |
| 2016/0374080 | A1* | 12/2016 | Wei | H04W 74/0833 |
| 2017/0180086 | A1* | 6/2017 | Xiong | H04L 1/1854 |
| 2018/0255586 | A1* | 9/2018 | Einhaus | H04L 5/00 |

OTHER PUBLICATIONS

ZTE, "Frequency hopping patterns for MTC enhancement," 3GPP TSG-RAN WG1 #83, R1-156663, Nov. 2015, 8 pages.

ZTE, "Remaining issues on random access for MTC coverage enhancement," 3GPP TSG-RAN WG1 #83, R1-156669, Nov. 2015, 8 pages.

MediaTek Inc., "Discussion on Preamble-based RA and Message-based RA for Rel-13 NB-IoT," 3GPP TSG-RAN WG1 #83, R1-156990, Nov. 2015, 6 pages.

Ericsson, "Narrowband IoT-Random Access Design," 3GPP TSG-RAN WG1 #83, R1-157424, Nov. 2015, 12 pages.

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.

European Patent Office Application Serial No. 16875947.0, Search Report dated Jul. 5, 2019, 6 pages.

Ericsson, "NB-IoT—UL Design", 3GPP TSG RAN WG1 Meeting #83, R1-157423, Nov. 2015, 7 pages.

* cited by examiner

METHOD AND WIRELESS DEVICE FOR TRANSMITTING RANDOM-ACCESS PREAMBLE BY MEANS OF SINGLE-TONE METHOD

CROSS-REFERENCE TO RELATED APPLICATIONS

This application is the National Stage filing under 35 U.S.C. 371 of International Application No. PCT/KR2016/013838, filed on Nov. 29, 2016, which claims the benefit of U.S. Provisional Application No. 62/269,102, filed on Dec. 18, 2015, 62/277,006, filed on Jan. 11, 2016, 62/288,400, filed on Jan. 28, 2016, and 62/306,600, filed on Mar. 10, 2016, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Recently, IoT (Internet of Things) communication has attracted attention. The IoT refers to communications that do not involve human interaction. There is a dissection about trying to accommodate such IoT communications in a cellular-based LTE system.

However, since the legacy LTE system has been designed for the purpose of supporting high-speed data communication, such an LTE system has been regarded as an expensive communication system.

However, the IoT communication is required to be implemented at a low price because of its characteristics, so that it may be widely used.

Thus, discussions about reducing bandwidth have been for cost reduction. However, an IoT device operating in a reduced band may perform communication in an area with a poor channel environment (e.g., under a bridge, under the sea, or on the sea) and thus can use repeated transmission or power boosting techniques. Power boosting may be a method in which a frequency domain is reduced and power is concentrated on a particular frequency resource. For example, when one RB includes 12 REs, transmission may be performed by concentrating power on a particular RE in a particular RB, instead of through a plurality of RBs.

A method of performing communication by concentrating power on one RE in a RB may be collectively referred to as a single-tone transmission method.

However, the single-tone transmission method is not currently supported by the 3GPP standard. In particular, according to the current 3GPP standard, a random access preamble for initial access is designed to be transmitted through one RB, that is, 12 subcarriers.

SUMMARY OF THE INVENTION

Accordingly, a disclosure of the present specification has been made in an effort to solve the aforementioned problem.

To achieve the foregoing purposes, the disclosure of the present invention proposes a method for transmitting a random access preamble. The method may be performed by a wireless device and comprise: generating a sequence of a random access preamble; mapping the sequence of the random access preamble onto one subcarrier among 12 subcarriers in a frequency domain. The mapping may include: performing a first hopping among plural sub-regions, each of which includes a pre-configured number of subcarriers, and performing a second hopping among the pre-configured number subcarriers in one sub-region.

The performing of the first hopping may comprise: selecting one sub-region among the plural sub-regions; and performing a hopping into the selected sub-region.

The performing of the second hopping may comprise: selecting one subcarrier among plural subcarriers included in the selected sub-region; performing a hopping into the selected subcarrier; and mapping the sequence of the random access preamble onto the selected subcarrier.

The method may further comprise: receiving information on the sub-regions via a higher layer signal.

The information on the sub-regions received via the higher layer signal may include: information on the pre-configured number of the subcarriers included in each sub-region.

The information on the sub-regions received via the higher layer signal may include: information on a frequency offset.

The sequence of the random access preamble may be generated based on an identifier of a narrowband internet of things (NB-IoT).

The method may further comprise: receiving a physical downlink control channel (PDCCH) order for triggering a transmission of the random access preamble.

The PDCCH order may include: downlink control information (DCI) including information on a subcarrier on which the random access preamble is transmitted.

To achieve the foregoing purposes, the disclosure of the present invention also proposes a wireless device for transmitting a random access preamble. The wireless device may comprise: a transceiver; and a processor configured to control the transceiver and configured to: generate a sequence of a random access preamble; map the sequence of the random access preamble onto one subcarrier among 12 subcarriers in a frequency domain. The mapping of the processor may include: performing a first hopping among plural sub-regions, each of which includes a pre-configured number of subcarriers, and performing a second hopping among the pre-configured number subcarriers in one sub-region.

According to the disclosure of the present specification, the problems of the above-described prior art are solved.

DESCRIPTION OF EXEMPLARY EMBODIMENTS

Figure 1:
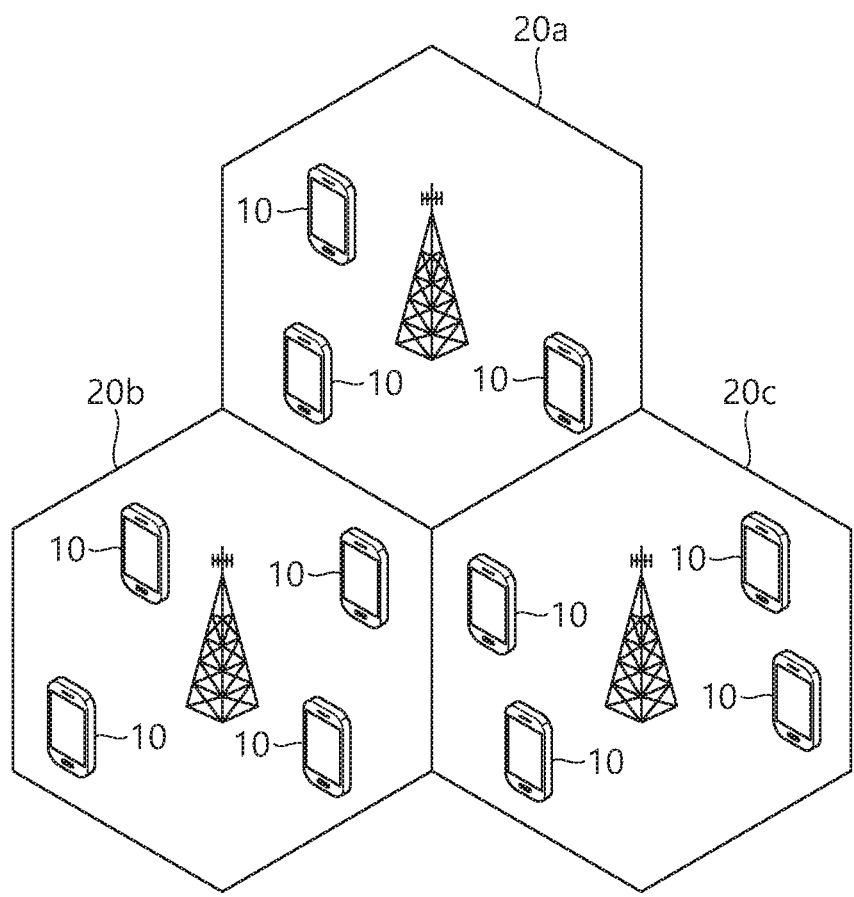
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
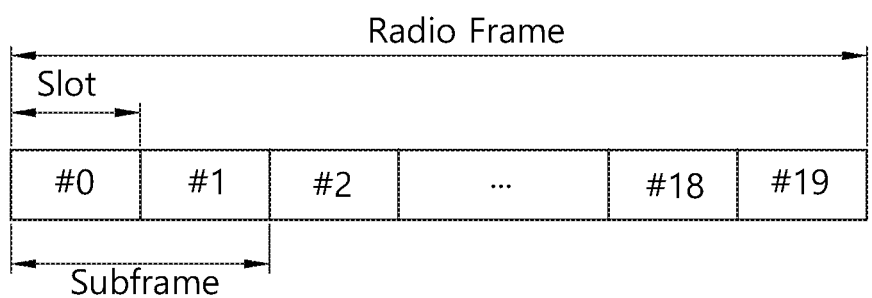
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
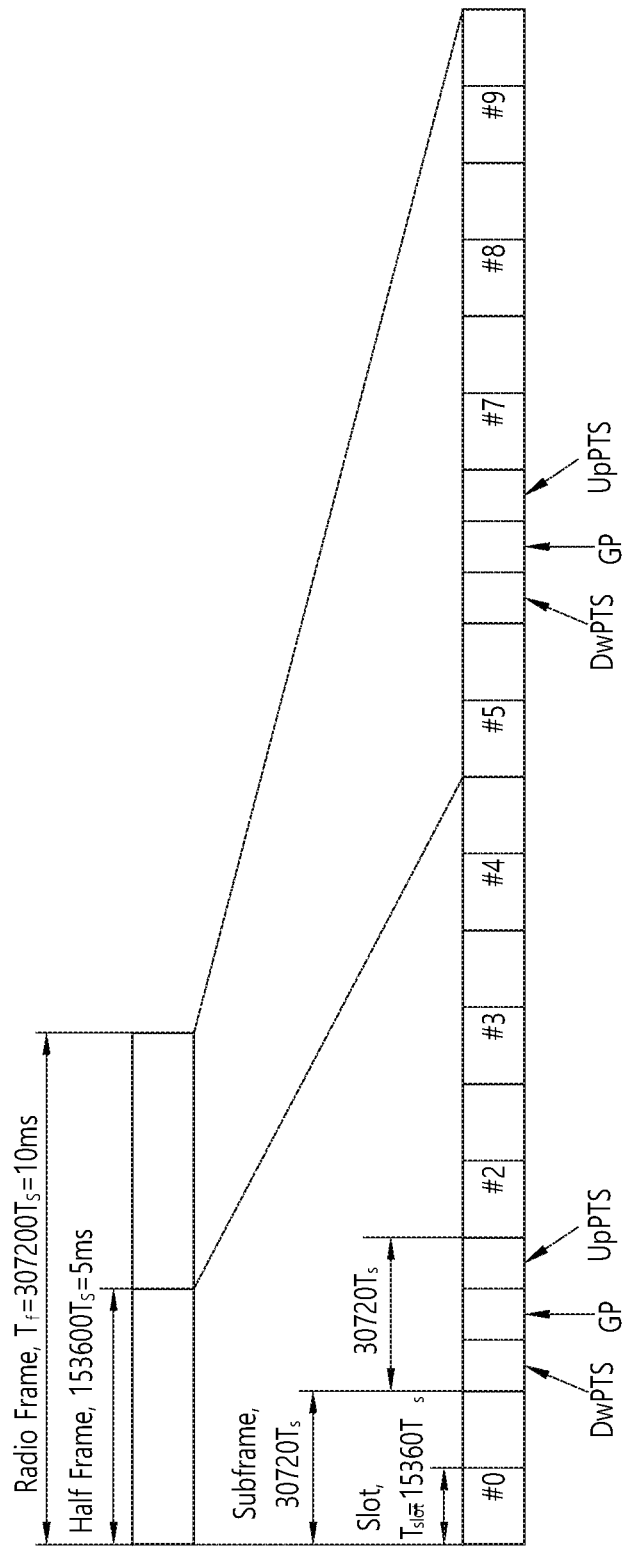
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
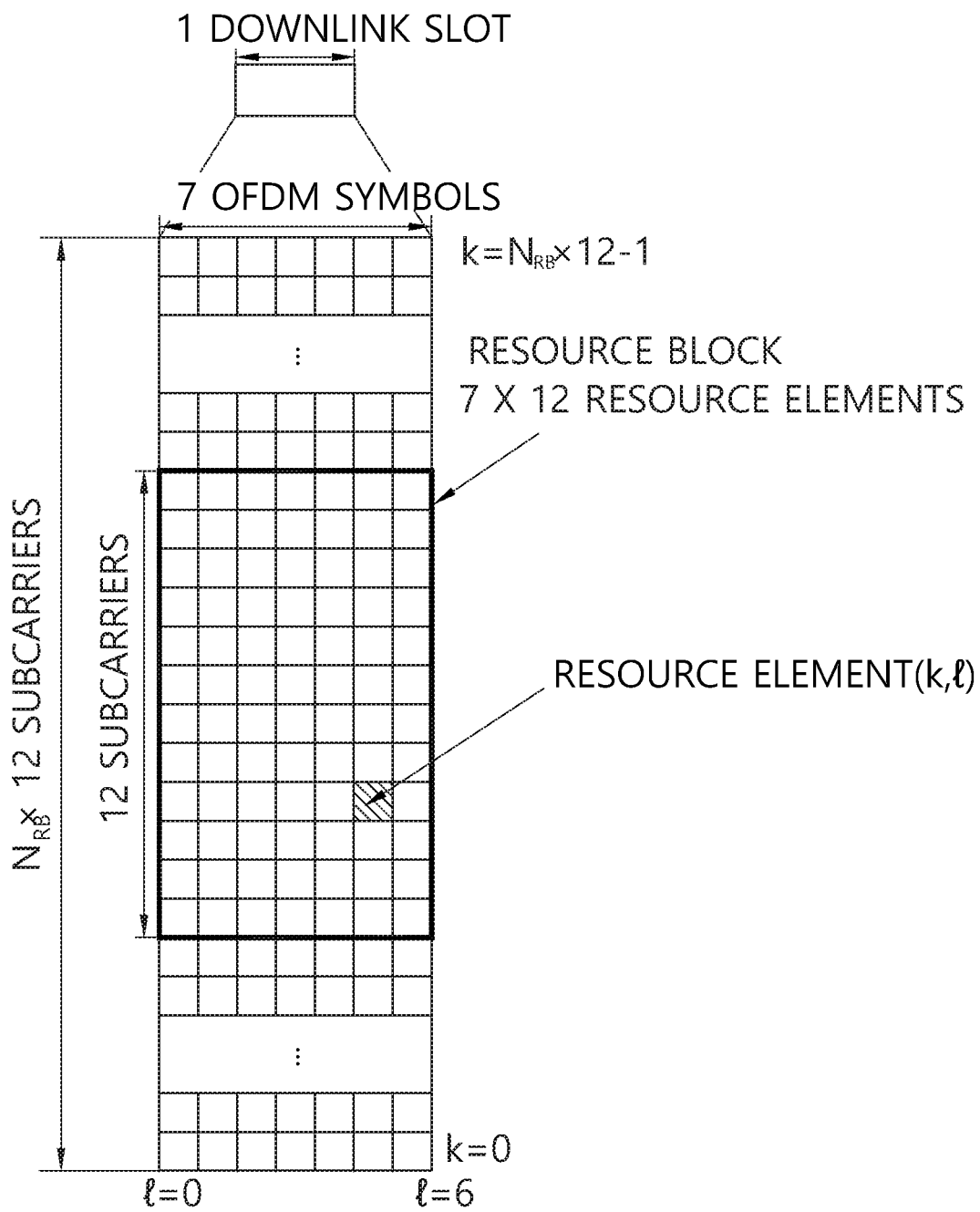
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 subcarriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 5:
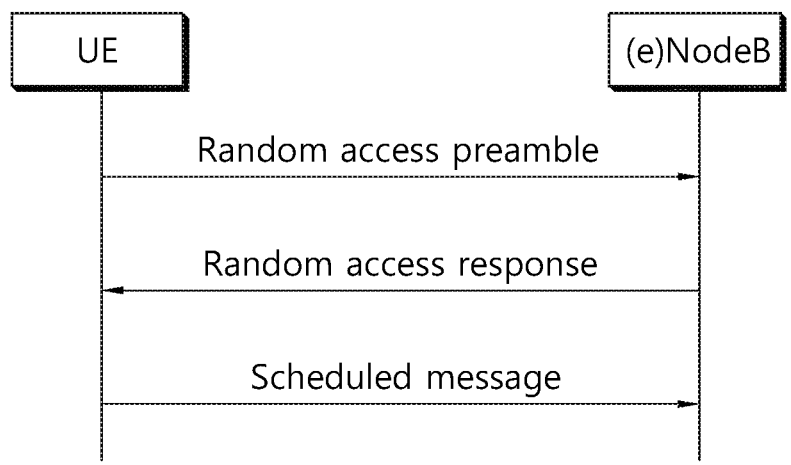
FIG. 5 is a flowchart illustrating a random access procedure in 3GPP LTE.

FIG. 5 is a flowchart illustrating a random access procedure in 3GPP LTE.

The random access procedure is used for the UE 10 to achieve UL synchronization with the base station, that is, eNodeB 20, or for UE to receive UL radio resource assignment from the base station.

The UE 10 receives a root index and a physical random access channel (PRACH) configuration index from the eNodeB 20. Each cell has 64 candidate random access preambles defined by a ZC (Zadoff-Chu) sequence. The root index refers to a logical index used for the UE to generate the 64 candidate random access preambles.

The transmission of random access preambles is limited to specific time and frequency resources for each cell. The PRACH configuration index indicates a specific subframe available for transmission of the random access preamble and a preamble format.

The UE 10 transmits an arbitrarily selected random access preamble to the eNodeB 20. In this connection, the UE 10 selects one of the 64 candidate random access preambles. Further, the UE 10 selects a subframe corresponding to the PRACH configuration index. The UE 10 transmits the selected random access preamble on the selected subframe.

Upon receiving the random access preamble, the eNodeB 20 sends a random access response (RAR) to the UE 10. The random access response is detected using two steps as follows. First, the UE 10 detects a PDCCH masked using a random access-RNTI (R-RNTI). Then, the UE 10 receives the random access response in a MAC (Medium Access Control) PDU (Protocol Data Unit) on a PDSCH indicated by the detected PDCCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<IoT (Internet of Things) Communication>

Hereinafter, the IoT communication will be described.

Figure 6A:
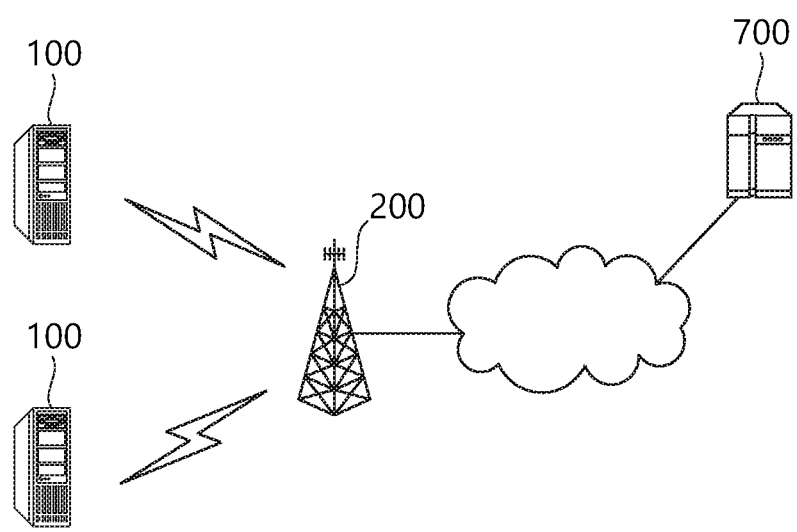
FIG. 6A shows an example of IoT (Internet of Things) communication.

FIG. 6A shows an example of IoT (Internet of Things) communication.

The IoT communication refers to the exchange of information between the IoT devices 100 without human interaction through the base station 200 or between the IoT device 100 and the server 700 through the base station 200. In this way, the IoT communication is also referred to as CIoT (Cellular Internet of Things) in that the IoT communication is performed through the cellular base station.

This IoT communication may refer to a kind of machine type communication (MTC). Therefore, the IoT device may be referred to as an MTC device.

The IoT service is differentiated from the conventional communication service in which a person is involved. The IoT service may include various categories of services, including tracking, metering, payment, medical services, and remote controls. For example, the IoT services may include meter reading, water level measurement, surveillance camera utilization, vending machine related inventory reporting, and so on.

The IoT communication has a small amount of transmitted data. Further, uplink or downlink data transmission/reception rarely occurs. Accordingly, it is desirable to lower a price of the IoT device 100 and reduce battery consumption in accordance with the low data rate. In addition, since the IoT device 100 has low mobility, the IoT device 100 has substantially the unchanged channel environment.

Figure 6B:
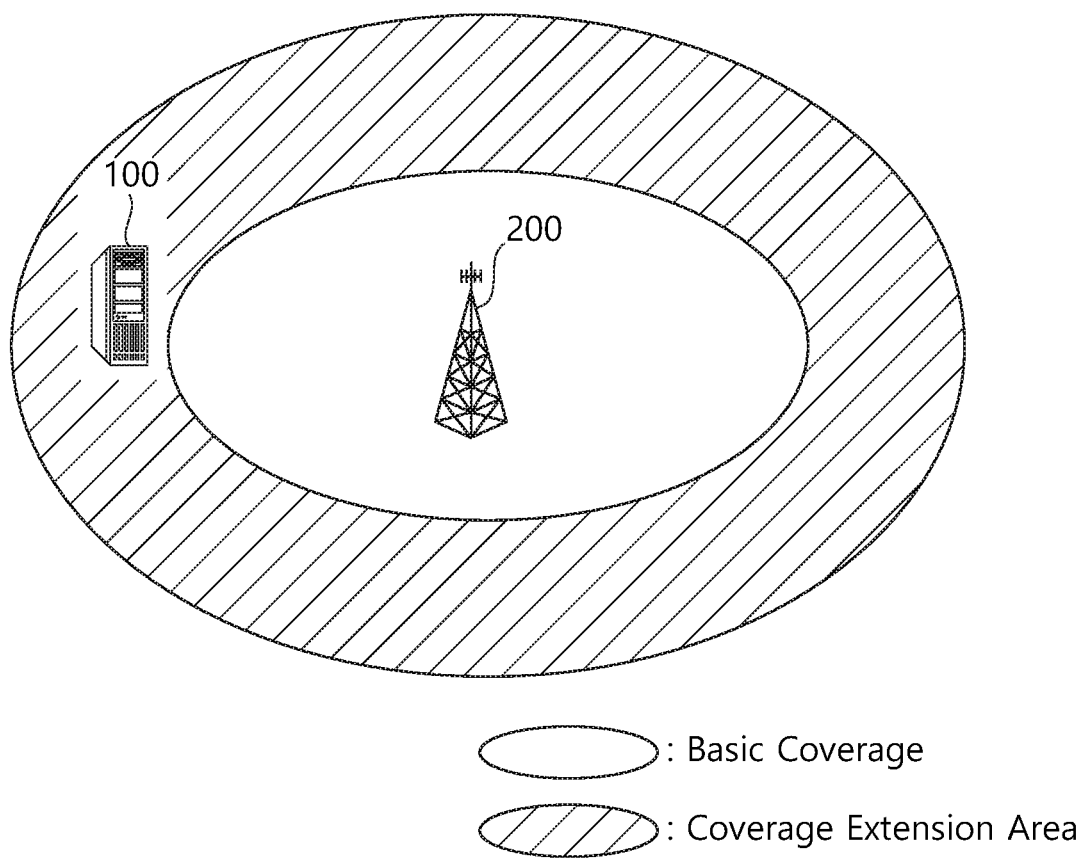
FIG. 6B is an example of a cell coverage extension or enhancement for an IoT device.

FIG. 6B is an example of a cell coverage extension or enhancement for the IoT device.

Recently, it is considered to extend or enhance the cell coverage of the base station for the IoT device 100. To this end, various techniques for cell coverage extension or enhancement are discussed.

However, if the coverage of the cell is extended or enhanced, and when the base station transmits the downlink channel to the IoT device located in the coverage extension (CE) or coverage enhancement (CE) region, the IoT device has difficulty in receiving the downlink channel. Similarly, when the IoT device located in the CE region transmits the uplink channel to the base station as the channel is, the base station has difficulty in receiving the uplink channel.

In order to solve this problem, the downlink channel or uplink channel may be repeatedly transmitted on a plurality of subframes. The transmission of uplink/downlink channels repeatedly on the plurality of subframes is referred to as bundle transmission.

Thus, the IoT device or base station may receive the bundle of downlink/uplink channels on the plurality of subframes, and may decode a part or all of the bundle. As a result, the decoding success rate can be increased.

Figure 7A:
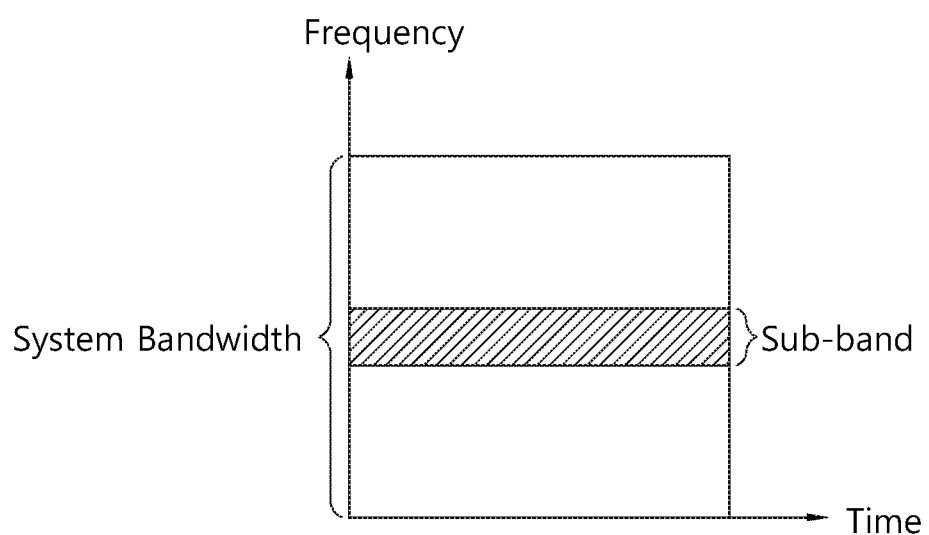
FIGS. 7A and 7B are views illustrating examples of a sub-band in which an IoT device operates.
Figure 7B:
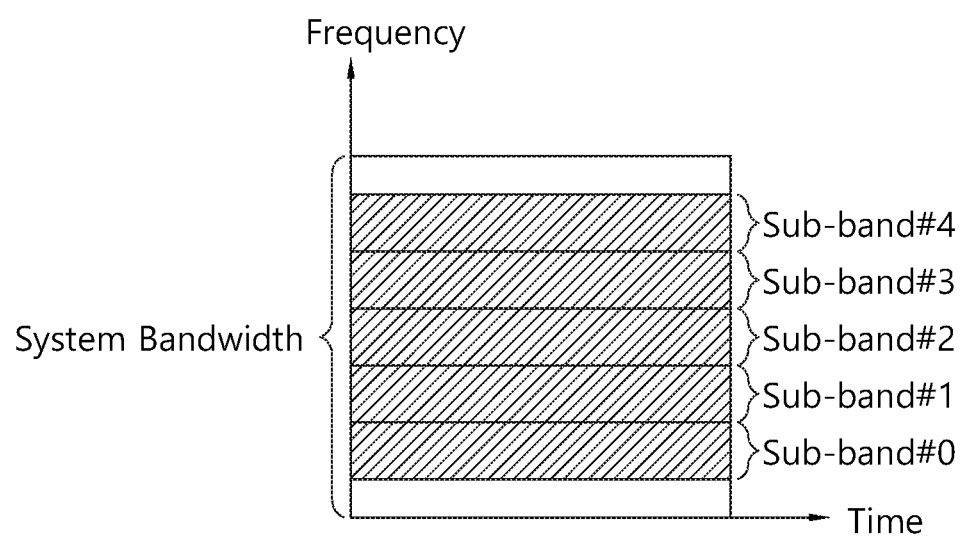

FIG. 7A and FIG. 7B are views illustrating examples of a sub-band in which the IoT device operates.

In one approach to a low cost of the IoT device, as shown in FIG. 7A, the IoT device may use, for example, a sub-band of approximately 1.4 MHz regardless of a system bandwidth of the cell.

In this connection, the region of the sub-band in which the IoT device operates may be located in a central region (e.g., six middle PRBs) of the system bandwidth of the cell, as shown in FIG. 7A.

Alternatively, as shown in FIG. 7B, in order to multiplex the IoT devices in one subframe, a plurality of sub-bands for the IoT devices are allocated in one subframe, so that different sub-bands may be used by different IoT devices. In this connection, most of the IoT devices may use sub-bands other than the sub-bands in the central region (e.g., the middle six PRBs) of the system band of the cell.

The IoT communication operating on such a reduced bandwidth may be called NB (Narrow Band) IoT communication or NB CIoT communication.

Figure 8:
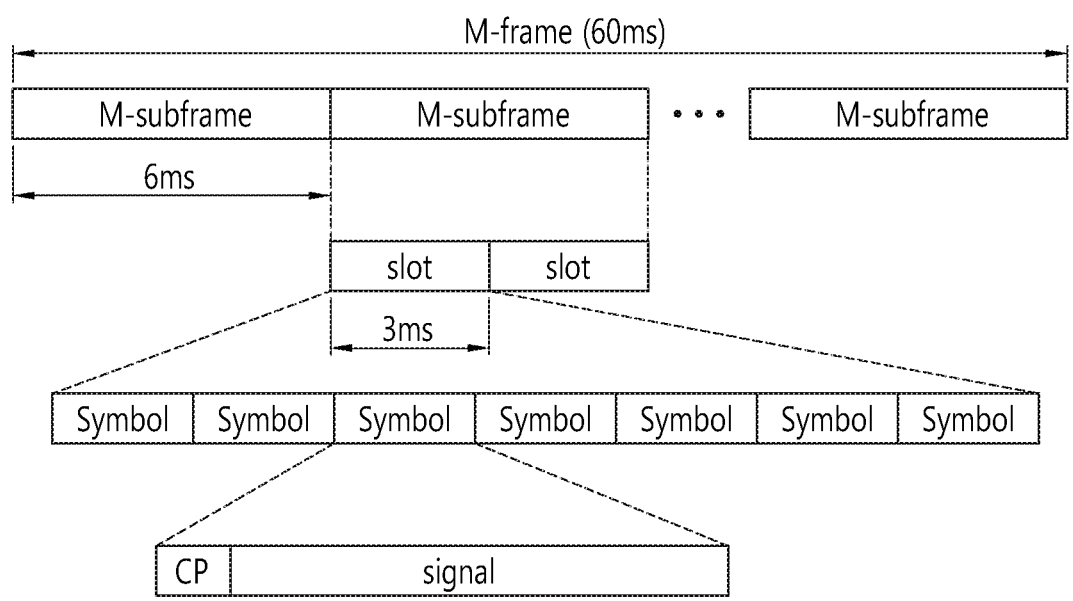
FIG. 8 shows an example of a time resource used for NB-IoT on M-frames basis.

FIG. 8 shows an example of a time resource used for the NB-IoT communication on M-frames basis.

Referring to FIG. 8, a frame that may be used for NB-IoT communication may be referred to as an M-frame, and the length of the M-frame may be illustratively 60 ms. Further, a subframe that may be used for the NB IoT communication may be referred to as an M-subframe, and its length may be exemplarily 6 ms. Thus, the M-frame may include ten M-subframes.

Each M-subframe may include two slots, and each slot may be illustratively 3 ms in length.

However, unlike what is shown in FIG. 8, a slot that may be used for the NB IoT communication may have a length of 2 ms. In this case, the subframe may have a length of 4 ms and the frame may have a length of 40 ms. Such a case will be described in more detail with reference to FIG. 9.

Figure 9:
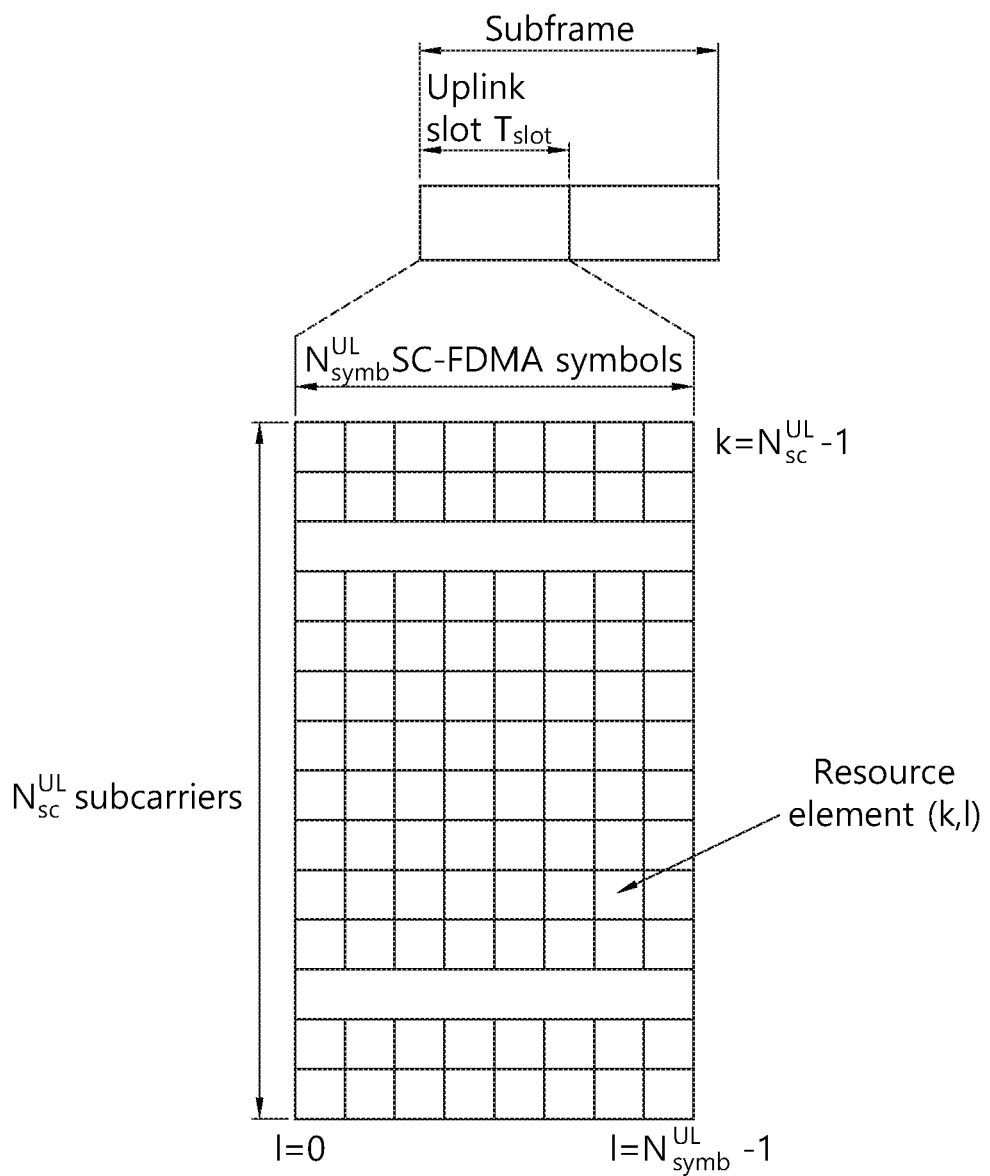
FIG. 9 shows another example of a time resource and a frequency resource that may be used for an NB IoT device.

FIG. 9 is another example of a time resource and a frequency resource that may be used for the NB IoT communication.

Referring FIG. 9, a physical channel or a physical signal transmitted on one slot in the uplink of the NB-IoT communication includes $N_{symb}^{UL}$ SC-FDMA symbols in the time domain, and $N_{sc}^{UL}$ subcarriers in the frequency domain. The uplink physical channel may be divided into an NPUSCH (Narrowband Physical Uplink Shared Channel) and an NPRACH (Narrowband Physical Random Access Channel). Further, in the NB-IoT communication, the physical signal may be NDMRS (Narrowband DeModulation Reference Signal).

In the NB-IoT communication, during the $T_{slot}$ slot, the uplink bandwidth of the $N_{sc}^{UL}$ subcarriers is as follows.

TABLE 3

| Subcarrier spacing | $N_{sc}^{UL}$ | $T_{slot}$ |
|---|---|---|
| Δf = 3.75 kHz | 48 | 61440 * $T_s$ |
| Δf = 15 kHz | 12 | 15360 * $T_s$ |

In the NB-IoT communication, each resource element (RE) of a resource grid nay be defined using an index pair (k, l) respectively indicating a time region and a frequency region in the corresponding slot. In this connection, k= 0, . . . , $N_{sc}^{UL}-1$, and l=0, . . . , $N_{symb}^{UL}-1$.

In the NB-IoT communication, a resource unit (RU) is used to map the NPUSCH to the resource element (RE). The resource units (RU) may be defined as successive subcarriers $N_{sc}^{RU}$, and successive SC-FDMA symbols $N_{symb}^{UL}$ $N_{slots}^{UL}$.

In this connection, $N_{sc}^{RU}$, $N_{symb}^{UL}$ and $N_{slots}^{UL}$ may be as follows:

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 | |
|   |  | 3 | 8 | |
|   |  | 6 | 4 | |
|   |  | 12 | 2 | |
| 2 | 3.75 kHz | 1 | 4 | |
|   | 15 kHz | 1 | 4 | |

In the above table, NPUSCH format 1 is used to transmit the uplink data channel. Further, NPUSCH format 2 is used to transmit uplink control information.

Symbols of a symbol block z(0), . . . , $z(M_{symb}^{sp}-1)$ are multiplied by an amplitude scaling factor based on a transmission power PNPUSCH. Then, the multiplied symbols z(0), . . . , $z(M_{symb}^{ap}-1)$ are mapped sequentially from z(0) to $z(M_{symb}^{ap}-1)$ to subcarriers allocated for transmission of the NPUSCH. The mapping for the resource element (k, l) starts at a first slot in an assigned resource unit (RU). Then, the resource element (k, l) is mapped in an increasing order from an index k to an index l. The NPUSCH may be mapped to one or more resource units (RUs).

Disclosure of Present Specification

In the present specification, a device that operates on a reduced bandwidth according to low-complexity/low-capability/low-specification/low-cost is hereinafter referred to as an LC device, a bandwidth-reduced (BL) device, or an NB-IoT device. Here, according to the disclosure of the present specification, coverage extension/enhancement (CE) may be divided into two modes. A first mode (also referred to as CE mode A) is a mode in which repeated transmission is not performed or a small number of repeated transmissions are allowed. A second mode (also referred to as CE mode B) is a mode in which a large number of repeated transmissions are allowed. An NB-IoT device (LC device or BL device) can be signaled as to which mode to operate in of these two modes. Here, different parameters may be considered by the NB-IoT device for transmission/reception of a control channel/data channel depending on the CE mode. Also, a DCI format monitored by the NB-IoT device may vary depending on the CE mode. However, some physical channels may be repeatedly transmitted the same number of times regardless of CE mode A and CE mode B.

The NB-IoT device may perform communication in an area with a poor channel environment (e.g., under a bridge, under the sea, or on the sea) and thus can use repeated transmission or power boosting techniques. Power boosting may be a method in which a frequency domain is reduced and power is concentrated on a particular frequency resource. For example, when one RB includes 12 REs, transmission may be performed by concentrating power on a particular RE in a particular RB, instead of through a plurality of RBs.

A method of performing communication by concentrating power on one RE in a RB may be collectively referred to as a single-tone transmission method.

However, the single-tone transmission method is not currently supported by the 3GPP standard. In particular, according to the current 3GPP standard, a random access preamble for initial access is designed to be transmitted through one RB, that is, 12 subcarriers.

Thus, the present specification is disclosed to improve a PRACH, specifically a random access preamble, in order to perform a random access procedure by a single-tone transmission method.

Hereinafter, the present specification will be described with reference to a PRACH, that is, a random access preamble, but the idea of the invention disclosed in the present specification can also be applied to other uplink channels. In addition, although the present specification illustrates a single-tone transmission method, the idea of the invention disclosed in the present specification can be extended to a multi-tone transmission method.

For the convenience of description, it is assumed in the present specification that a BS has a cell coverage radius of 35 km. For the convenience of description, it is assumed in the present specification that a subcarrier spacing is 15 kHz or 3.75 kHz.

I. First Embodiment: Design of Frequency Resource Unit for Transmission of PRACH Signal (e.g., Random Access Preamble)

When a wireless device transmits a PRACH at a plurality of frequencies by a single-tone transmission method, a BS may estimate the arrival time. For example, it is assumed that, defining a PRACH signal (e.g., a random access preamble) as x(t), the wireless device transmits X[0] at frequency f1 in a first time period and transmits X[1] at frequency f2 in a second time period. Here, it is assumed that frequencies f1 and f2 are spaced apart from each other by a predetermined frequency offset. Then, the BS can measure the arrival time, robustly against a frequency error, using the frequency offset. Specifically, when the reciprocal number of a subcarrier spacing is denoted by T, arrival time is denoted by $\Delta t$, and a frequency is denoted by $\Delta f$, a value mapped to an RE corresponding to frequency f1 is $X[0]*\exp(-j2\pi\{f1+\Delta f\}/T\}\Delta t)$ and a value mapped to an RE corresponding to frequency f2 is $X[1]*\exp(-j2\pi\{f2+\Delta f\}/T\}\Delta t)$. By conjugate multiplication using the values of these two REs, $X[0]*X[1]*\exp(-j2\pi\{f2-f1\}/T\}\Delta t)$ can be derived, by which the arrival time can be calculated. However, a range in which the arrival time can be measured may be limited to up to T (limited to a case where the difference between f2 and f1 is 1).

The foregoing transmission of the PRACH signal (e.g., random access preamble) in the two time periods may be extended to a plurality of time periods (e.g., 100 times). Further, the number of frequency intervals may also be plural. However, considering overheads, two frequency intervals may be effective. A time period for continuously transmitting a PRACH signal (e.g., a random access preamble) on the same frequency resource may be referred to as a PRACH symbol, and a unit for a PRACH signal (e.g., a random access preamble) transmitted in a corresponding region may be referred to as a frequency resource unit. A specific example of a frequency resource unit for transmission of a PRACH signal (e.g., a random access preamble) is illustrated below, which will be described with reference to FIGS. 10A to 10D.

Figure 10A:
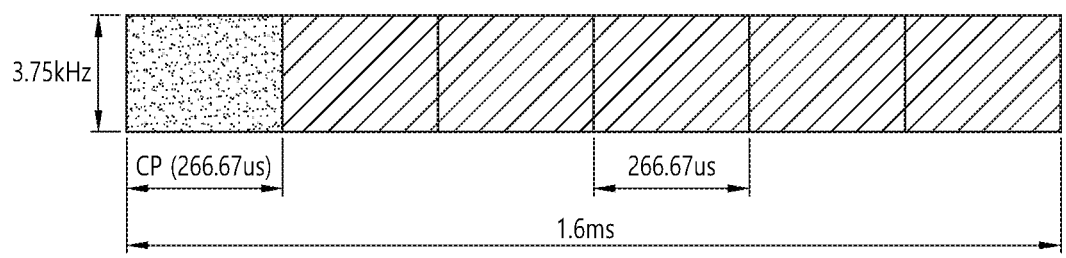
FIGS. 10A and 10B illustrate a first example of a first embodiment of the present specification.
Figure 10B:
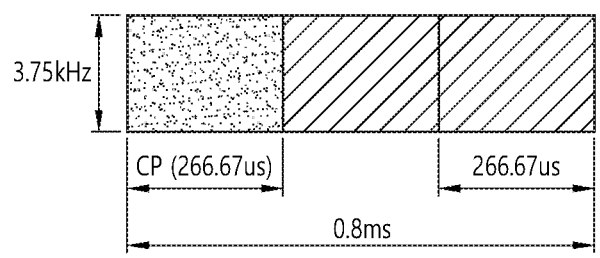
Figure 10C:
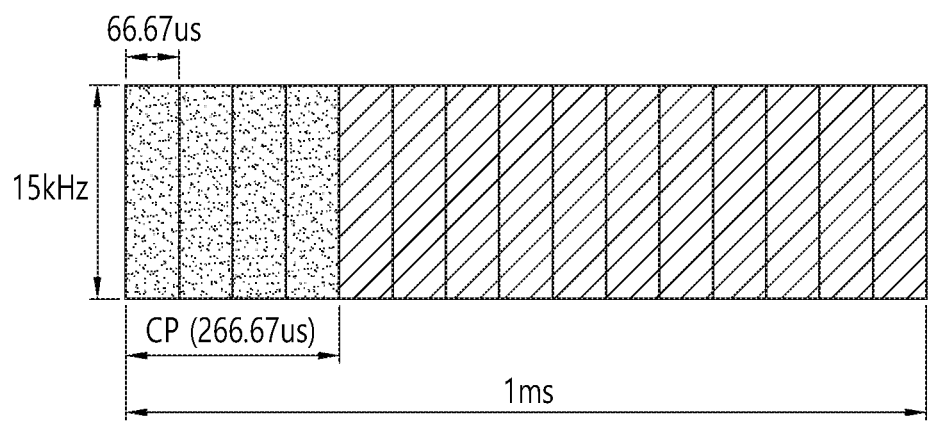
FIG. 10C illustrates a second example.
Figure 10D:
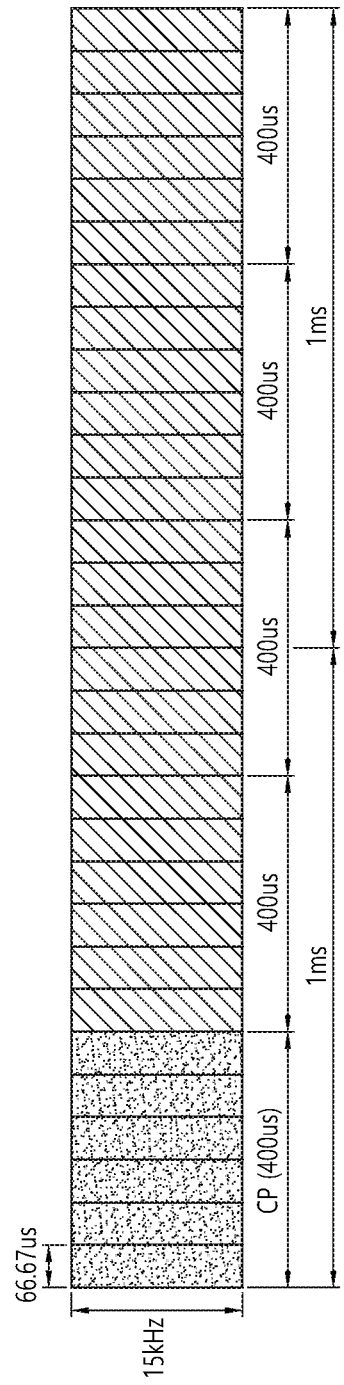
FIG. 10D illustrates a third example.

FIGS. 10A and 10B illustrate a first example of the first embodiment of the present specification. FIG. 10C illustrates a second example, and FIG. 10D illustrates a third example.

In the first example, it is assumed that the subcarrier spacing is 3.75 kHz. Here, a frequency resource unit for transmission of a PRACH signal (e.g., a random access preamble) may include six sub-symbols. One sub-symbol is used as a CP. When a BS has a cell coverage radius of 35 km, the round-trip time (RTT) may be 233.33 s and the maximum delay spread may be 16.67 µs. Therefore, as illustrated in FIGS. 10A and 10B, it is proposed in the first example to design a CP to have a length of 266.67 µs. As illustrated in FIG. 10A, when the number of sub-symbols included in the frequency resource unit for transmission of the PRACH signal (e.g., a random access preamble) is six, the frequency resource unit for transmission of the PRACH signal (e.g., a random access preamble) may be 1.6 ms. As illustrated in FIG. 10B, when the number of sub-symbols is three, the frequency resource unit may be 0.8 ms. Further, when the number of sub-symbols is 15, the frequency resource unit may be 4 ms.

In the second example, it is assumed that the subcarrier spacing is 15 kHz. Here, a frequency resource unit for transmission of a PRACH signal (e.g., a random access preamble) may include 15 sub-symbols. Four sub-symbols are used as a CP. Referring to FIG. 10C, it is proposed in the second example to set the length of the CP to 266.67 µs. Depending on a value mapped to each sub-symbol, the desired coverage radius of a BS may be supported. When the same value is mapped to the respective sub-symbols, an arrival time of only up to 66.67 s can be measured and distinguished. Unlike in FIG. 10C, the number of sub-symbols included in the frequency resource unit for transmission of the PRACH signal (e.g., a random access preamble) may be 12 or 24. When the number of sub-symbols is 12, the frequency resource unit for transmission of the PRACH signal (e.g., a random access preamble) may have a length of 0.8 ms. When the number of sub-symbols is 24, the frequency resource unit for transmission of the PRACH signal (e.g., a random access preamble) may have a length of 1.6 ms.

In the third example, it is assumed that the subcarrier spacing is 15 kHz, and a frequency resource unit for transmission of a PRACH signal (e.g., a random access preamble) may include 30 sub-symbols. Here, six sub-symbols are used as a CP. Referring to FIG. 10D, it is proposed in the third example to set the length of the CP to 400 µs. Depending on a value mapped to each sub-symbol, the desired coverage radius of a BS may be supported. When the same value is mapped to the respective sub-symbols, an arrival time of only up to 66.67 µs can be measured and distinguished. Unlike in FIG. 10D, the number of sub-symbols included in the frequency resource unit for transmission of the PRACH signal (e.g., a random access preamble) may be 12 or 24. When the number of sub-symbols is 12, the frequency resource unit for transmission of the PRACH signal (e.g., a random access preamble) may have a length of 0.8 ms. When the number of sub-symbols is 24, the frequency resource unit for transmission of the PRACH signal (e.g., a random access preamble) may have a length of 1.6 ms.

A symbol which is a frequency resource unit for transmission of a PRACH signal (e.g., a random access preamble) may be subjected to frequency hopping, which will be described with reference to FIG. 11.

Figure 11:
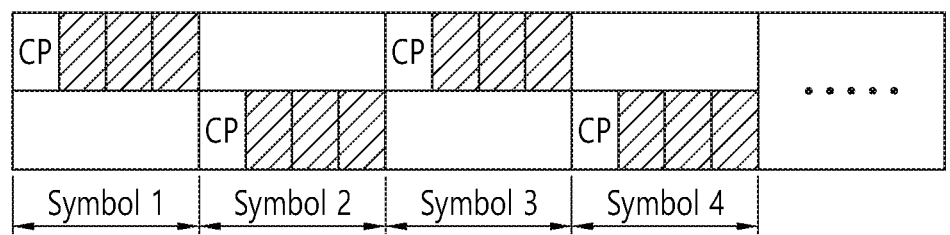
FIG. 11 illustrates an example of transmission of a symbol which is a frequency resource unit for transmission of a PRACH signal (e.g., a random access preamble).

FIG. 11 illustrates an example of transmission of a symbol which is a frequency resource unit for transmission of a PRACH signal (e.g., a random access preamble).

As illustrated in FIG. 11, a symbol which is a frequency resource unit for transmission of a PRACH signal (e.g., a random access preamble) may be subjected to frequency hopping. In this case, the same value may be set to be mapped to each sub-symbol in view of PAPR, and a different value may be mapped for each frequency resource unit. When a plurality of units forms one PRACH signal (e.g., a random access preamble), values transmitted for individual frequency resource units may be expressed in a sequence form. For example, when 100 units form a PRACH signal (e.g., a random access preamble), one value in a sequence having a length of 100 may be considered to be transmitted in each unit. A frequency at which a unit is transmitted at each time may be changed, and hopping between two or more regions in a particular pattern may be considered.

I-1. Addition of Guard Time (GT)

For the foregoing frequency resource unit, considering coexistence with another transport channel (e.g., PUCCH/PUSCH), it may be considered to add a guard time (GT) after transmission of a sequence. The GT period is based on a symbol number, that is, a multiple of T, and may be set to 233.33 s or longer. Alternatively, the GT period is based on a symbol number, that is, a multiple of T, and may be set such that a frequency resource unit for transmission of a PRACH signal (e.g., a random access preamble) ends with a multiple of 1 ms (relative to a subcarrier spacing of 15 kHz) in order to match the boundary of a subframe for another physical channel. Specifically, among a plurality of frequency resource units for all PRACH transmissions, only a particular unit may have a GT. The particular unit may be the last unit among those for PRACH transmission.

When a GT is not employed, it may be considered to allocate a dedicated frequency resource for a PRACH signal (e.g., a random access preamble). Specifically, the frequency resource may be reported to a wireless device via a higher-layer signal (e.g., an RRC signal) or SIB. Transmission of other physical channels, such as PUCCH and PUSCH, is restricted in the corresponding region.

I-2. Time-Domain Transmission Unit for PRACH Signal (e.g., Random Access Preamble)

In the single-tone transmission method, a basic PRACH transmission unit may be set to be longer than a subframe for other transport channels, in which case a plurality of PRACH resources may be allocated for a single or a plurality of subframe groups. Basically, a PRACH resource may be transmitted on the boundary of a subframe or a slot and may include a first part or a last part of a subframe boundary. Alternatively, a form in which a subframe boundary is not aligned with the start or end position of a PRACH resource may be considered in order to maximize a PRACH resource included in a particular subframe or subframe group. Specifically, the resource may be used only for PRACH repetition. The foregoing description is merely an example and may be extended to a multi-tone transmission method.

Figure 12A:
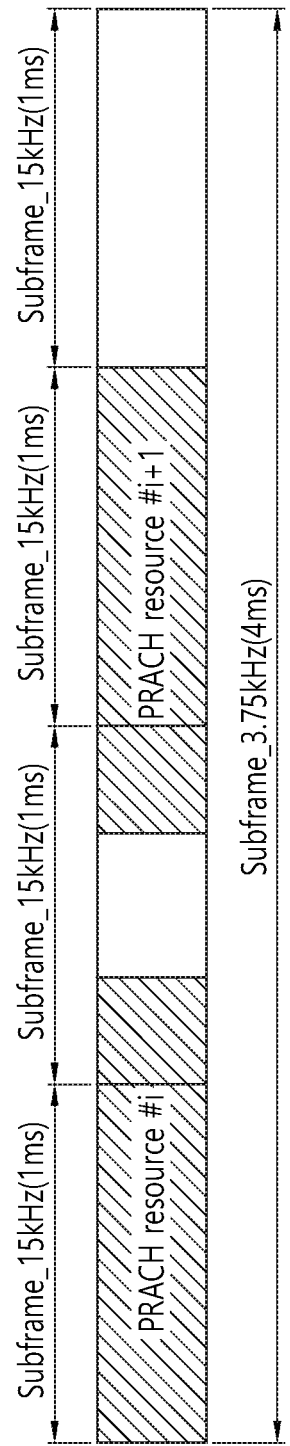
FIGS. 12A to 12C illustrate examples in which a time resource unit for a PRACH signal (e.g., a random access preamble) is 1.3 ms when a subframe has a length of 1 ms and when a subframe has a length of 4 ms.
Figure 12B:
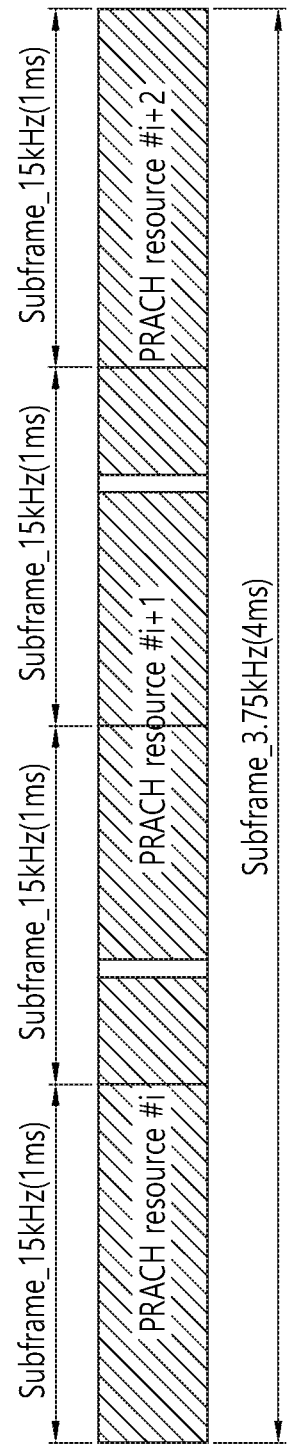
Figure 12C:
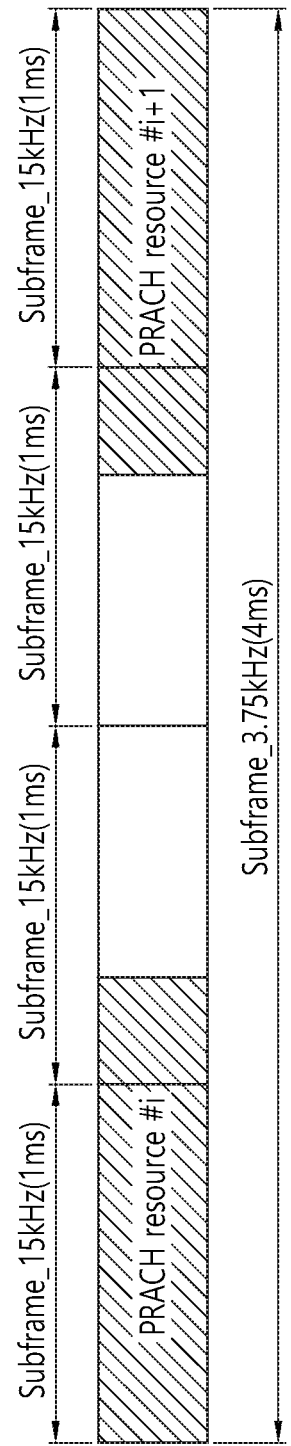

FIGS. 12A to 12C illustrate examples in which a time resource unit for a PRACH signal (e.g., a random access preamble) is 1.3 ms when a subframe has a length of 1 ms and when a subframe has a length of 4 ms.

Referring to FIG. 12A, where a subframe has a length of 1 ms, a first time resource with a length of 1.3 ms for a PRACH signal (e.g., a random access preamble) is allocated to be aligned with the start boundary of a first subframe, and a second time resource with a length of 1.3 ms is allocated to the end boundary of a third subframe. Referring to FIG. 12B, where a subframe has a length of 4 ms, a first time resource with a length of 1.3 ms for a PRACH signal (e.g., a random access preamble) is allocated to be aligned with the start boundary of a subframe, and a second time resource is allocated to be aligned with a point 1 ms away from the end of the subframe.

Further, referring to FIG. 12B, where a subframe has a length of 1 ms, a first time resource with a length of 1.3 ms is allocated to be aligned with the start boundary of a first subframe, and a third time resource with a length of 1.3 ms is allocated to the end boundary of a fourth subframe. A second time resource with a length of 1.3 ms is allocated such that the center thereof is aligned with the boundary between second and third subframes. Referring to FIG. 12B, where a subframe has a length of 4 ms, a first time resource with a length of 1.3 ms is allocated to be aligned with the start boundary of a subframe, and a third time resource with a length of 1.3 ms is allocated to be aligned with the end boundary of the subframe. A second time resource with a length of 1.3 ms is allocated such that the center thereof is aligned with the center of the 4 ms subframe.

Referring to FIG. 12C, where a subframe has a length of 1 ms, a first time resource with a length of 1.3 ms is allocated to be aligned with the start boundary of a first subframe, and a third time resource with a length of 1.3 ms is allocated to be aligned with the end boundary of a fourth subframe. Referring to FIG. 12C, where a subframe has a length of 4 ms, a first time resource with a length of 1.3 ms is allocated to be aligned with the start boundary of a subframe, and a second time resource with a length of 1.3 ms is allocated to be aligned with the end boundary of the subframe.

I-3. TDD Environment

It is necessary to consider interference that is received from or is given to a TDD system when a PRACH for NB-IoT is transmitted in the TDD system or a TDD system depending on the environment of a neighboring cell. In this case, it is needed to set a PRACH resource only in a UL region in accordance with a particular TDD UL-DL configuration. A simple method may be considered in which a time-domain transmission unit for a PRACH signal (e.g., a random access preamble) is designed to be 1 ms or shorter and is allocated to a UL region. Generally, as the number of symbols forming a time-domain transmission resource increases, a sequence can be repeated or the length of a sequence can be extended, which can improve the performance of a BS detecting a PRACH signal (e.g., a random access preamble). Therefore, it is considered to change the length of a time-domain transmission unit for a PRACH signal (e.g., a random access preamble) or to change the number of symbols forming the time-domain transmission unit depending on the number of available UL subframes or a UL region (e.g., a symbol unit). The UL region may be a plurality of consecutive UL subframes set according to a TDD UL-DL configuration or may be a corresponding time period. In addition, it is considered to also include a time period corresponding to UpPts in a time-domain transmission resource for a PRACH signal (e.g., a random access preamble) depending on a special subframe configuration. The time-domain transmission resources for the PRACH signal (e.g., a random access preamble) generated by the above methods may be set in different PRACH formats. Alternatively, a time-domain transmission resource for a PRACH signal (e.g., a random access preamble) may be set on the basis of a parameter signaled via a higher-layer signal. Alternatively, a time-domain transmission resource for a PRACH signal (e.g., a random access preamble) may be preset according to the TDD UL-DL configuration and/or the special subframe configuration.

A specific example of defining a time-domain transmission resource for a PRACH signal (e.g., a random access preamble) according to the TDD UL-DL configuration is illustrated below. Hereinafter, for the convenience of description, it is assumed that a subcarrier spacing for a PRACH signal (e.g., a random access preamble) is 3.75 kHz. However, even though the subcarrier spacing is changed, when the number of symbols is suitably changed according to the UL time period described below, the following description may be applied. When a time period and a time-domain transmission resource for a PRACH signal (e.g., a random access preamble) do not correspond to each other in length, (1) the time-domain transmission resource for the PRACH signal (e.g., a random access preamble) may be aligned with the start or end boundary of a UL time period including UpPts, or (2) the time-domain transmission resource for the PRACH signal (e.g., a random access preamble) may be aligned with the start or end boundary of consecutive UL subframe groups excluding UpPts.

First Example: Three UL Subframes+0/1/2 UL Symbols

According to the first example, a time-domain transmission resource for a PRACH signal (e.g., a random access preamble) may be represented by a time period of 3 ms, 3.667 ms, 4.333 ms, or the like. In TDD UL-DL configuration #0, the time-domain transmission resource may be the entire period of a radio frame. In TDD UL-DL configurations #3 and #6, the time-domain transmission resource may be the first half period of a radio frame. When a subcarrier spacing is 3.75 kHz, the time-domain transmission resource may be 9 or 11, 12 or 13, or 15 or 16 symbols. To set the time-domain transmission resource for the PRACH signal (e.g., a random access preamble) in ms, 9 (2.4 ms), 12 (3.2 ms) and 15 (4 ms) symbols may be set. Here, a CP may be one symbol.

Second Example: Two UL Subframes+0/1/2 UL Symbols

According to the second example, a time-domain transmission resource for a PRACH signal (e.g., a random access preamble) may be represented by a time period of 2 ms, 2.667 ms, 3.333 ms, or the like. In TDD UL-DL configuration #1, the time-domain transmission resource may be the entire period of a radio frame. In TDD UL-DL configuration #4, the time-domain transmission resource may be the first half period of a radio frame. In TDD UL-DL configuration #6, the time-domain transmission resource may be the last half period of a radio frame.

Third Example: One UL Subframes+0/1/2 UL Symbols

According to the third example, a time-domain transmission resource for a PRACH signal (e.g., a random access preamble) may be represented by a time period of 1 ms, 1.667 ms, 2.333 ms, or the like. In TDD UL-DL configuration #2, the time-domain transmission resource may be the entire period of a radio frame. In TDD UL-DL configuration #5, the time-domain transmission resource may be the first half period of a radio frame.

II. Second Embodiment: Method for Mapping Data/Sequence in Frequency Resource Unit for Transmission of PRACH Signal (e.g., Random Access Preamble)

When a subcarrier spacing is not set to be sufficiently short, compared to the desired cell coverage radius of a BS, the arrival time of a PRACH signal (e.g., a random access preamble) that the BS can distinguish is reduced. Thus, the foregoing method of mapping the same value to all sub-symbols in a time transmission resource may not be suitable. Therefore, in order to efficiently estimate the arrival time of a PRACH signal (e.g., a random access preamble), it is necessary to design a different value or sequence to be mapped to a sub-symbol. Generally, since NB-IoT devices are manufactured with low performance in order to reduce complexity, it is necessary to maximally reduce PAPR. Thus, it may be advantageous to maintain a small variation in value between sub-symbols in a time-domain transmission resource for a PRACH signal (e.g., a random access preamble). A specific example of a method for mapping a value to a sub-symbol in a time-domain resource for a PRACH signal (e.g., a random access preamble) is illustrated below.

Figure 13A:
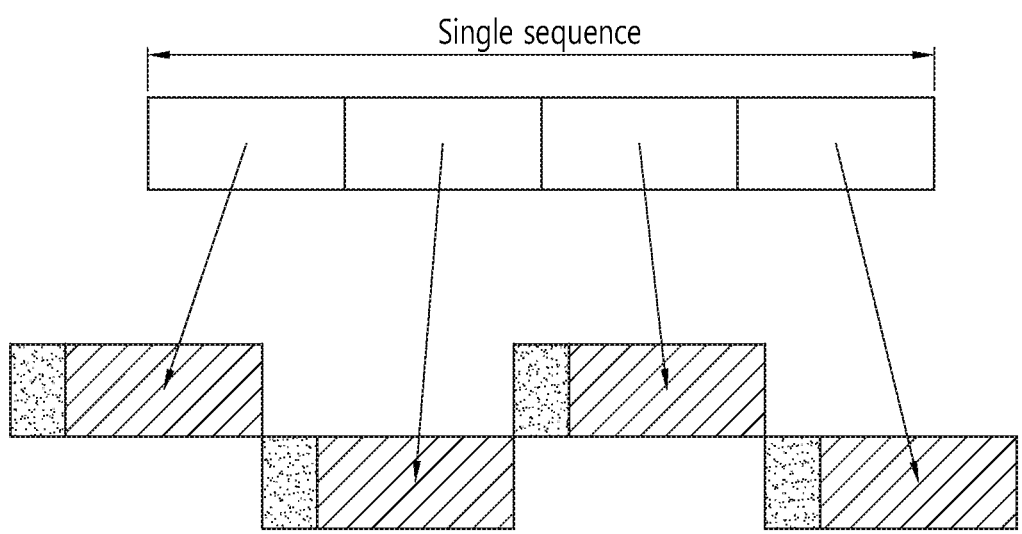
FIG. 13A illustrates a first example of a second embodiment of the present specification.
Figure 13B:
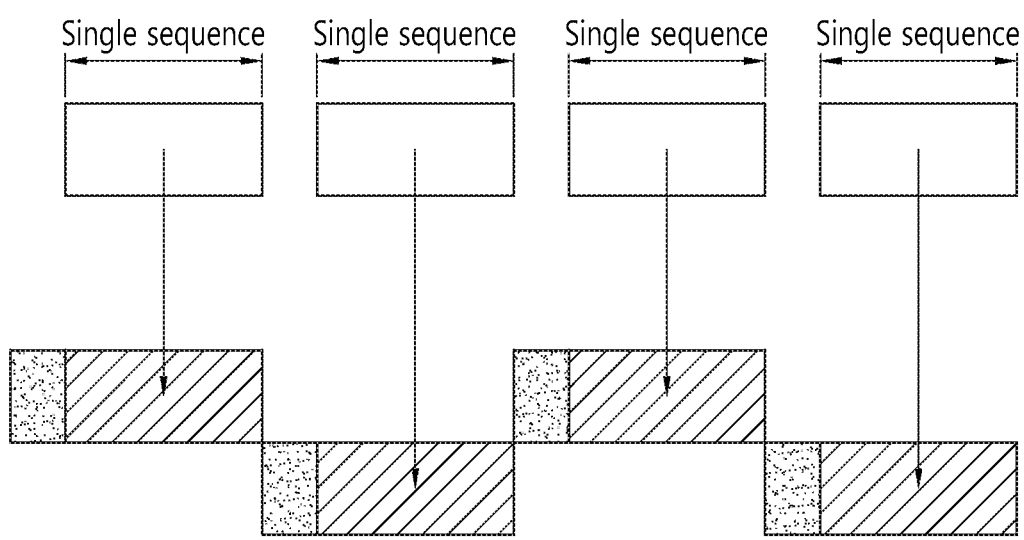
FIG. 13B illustrates a third example.

FIG. 13A illustrates a first example of the second embodiment of the present specification. FIG. 13B illustrates a third example.

For the convenience of description, the number of sub-symbols in a time-domain resource for a PRACH signal (e.g., a random access preamble) is denoted by Nseq, the number of sub-symbols for a CP is denoted by Ncp, and the number of time-domain resource units for transmitting a PRACH signal (for example, a the preamble is transmitted is den random access preamble) is denoted by M.

In the first example, a wireless device first generates a sequence with a length of (Nseq-Ncp)*M. That is, as illustrated in FIG. 13A, when M=4, the wireless device generates a sequence with a length of (Nseq-Ncp)*4 and divides the sequence to be allocated to four time-domain resources. The sequence may be a Zha-doff Chu (ZC) sequence. In order to have a length of a prime number, the ZC sequence may be obtained by generating a sequence to be longer than (Nseq-Ncp)*M and cutting off a portion or by generating a sequence to be shorter than (Nseq-Ncp)*M and circularly repeating the sequence. A plurality of sequences may be generated by adding root index, or a different sequence may be generated using a cyclic shift in the same root index.

Alternatively, a sequence with a length of (Nseq-Ncp)*M' may be generated, where M' is smaller than the number of time-domain resource units for transmitting a PRACH signal (e.g., a random access preamble). M' may be a preset value or a value signaled through a higher-layer signal or a system information block (SIB).

In a second example, the wireless device generates a sequence with a length of Nseq*M. The sequence may be a sequence for Decrete Fourier Transform (DFT). The DFT sequence may be $\exp(j2\pi \cdot k \cdot p/((Nseq-Ncp)*M))$, where k=0, 1, . . . , (Nseq−Ncp)*M−1. The value of p may be adjusted to generate an additional sequence. The value of p may be limited in view of PAPR. For example, the value of p may include at least 1 and (Nseq−Ncp)*M−1.

In the third example, the wireless device generates a sequence with a length of (Nseq-Ncp) for each time-domain resource unit. That is, as illustrated in FIG. 13B, when M is 4, the wireless device generates four sequences with a length of (Nseq−Ncp). The sequence may be a ZC sequence or a DFT sequence. The same sequence may be mapped to all of individual time-domain resource units or a different sequence may be generated for each time-domain resource unit. It may be considered to generate at least two types of sequences in view of improvement in autocorrelation performance and complexity. For example, a first sequence may be used for a first tone, and a second sequence may be used for a second tone.

In the above examples, a sub-symbol in each time-domain resource unit includes a sequence with a length of (Nseq−Ncp) and a CP generated by copying the last part of the sequence.

Although the sequence has been illustrated as a ZC sequence or a DFT sequence, other sequences may be applied.

When there is a plurality of sequences for a PRACH signal (e.g., a random access preamble) configured with a plurality of time-domain resource units (e.g., a smaller number of sequences than M are generated and distributed in the first example or a sequence is generated for each time-domain resource unit in the third example), it may be considered to additionally introduce an orthogonal cover code (OCC) in order to increase multiplexing capacity. For example, when the number of time-domain resource units is M, an OCC with a length of M may be generated, and an OCC configuration value may be multiplied with a symbol value in each time-domain resource unit for each time-domain resource unit. Alternatively, M/M 'OCCs with a length of M', which is smaller than M, may be generated, and an OCC with a length of M may be applied to each symbol value in M' time-domain resource units. Then, a BS can distinguish a plurality of PRACHs by a combination of a sequence and an OCC. More specifically, for multiplexing, a root index and/or cyclic shift and/or OCC for a sequence may be changed. In a case of using a plurality of ZC sequences, it may be considered to set a different cyclic shift for each ZC sequence.

When the same value is mapped in the same time-domain resource unit, it may be necessary to generate a sequence with a length of M in view of all PRACH signals (e.g., random access preambles).

III. Third Embodiment: Methods for Frequency Hopping Between Frequency Resource Units and Resource Mapping for Transmission of PRACH Signal (e.g., Random Access Preamble)

The accuracy with which a BS estimates the arrival time of a received PRACH may vary depending on a frequency region occupied for PRACH transmission. For example, as the frequency region occupied for the PRACH transmission is wider, the result of performing an autocorrelation function becomes sharper. That is, a correlation value is sharply different depending on whether timing is right or not. Therefore, an error range may be reduced when estimating the arrival time. For the foregoing method, it may be considered to perform frequency hopping when mapping a PRACH signal (e.g., a random access preamble) according to the single-tone transmission method to a frequency resource unit. However, depending on a method of designing a frequency resource unit, the maximum estimable arrival time range may be reduced as the value increases according to the difference between the frequencies to which a frequency resource unit is mapped (in section I, the estimable range can be expressed as $T/(f2-f1)$). Therefore, in a next-generation system, it is possible to introduce a plurality of times of frequency hopping for a PRACH signal (e.g., a random access preamble) according to the single-tone transmission method. Further, a frequency change range may be varied when performing each time of hopping. For example, a first range may have two frequency regions to be adjacent, while a second range may have two frequency regions to be as far away as possible.

In mapping a PRACH signal (e.g., a random access preamble) according to the single-tone transmission method to a time-frequency resource unit, when a sequence of a random access preamble is generated and/or resource mapping is performed in view of interference between a plurality of cells, inter-cell randomization may be required. For example, for the sequence of the random access preamble, (1) a wireless device may consider generating a single random access preamble or a plurality of random access preambles to be different for each cell using a physical cell ID, identification information on a cell performing an NB-IoT operation, or a seed value signaled through a higher-layer signal. Alternatively, (2) a network may adjust the sequence of the random access preamble or the set of the sequence to be set differently for each cell. Then, each cell may notify wireless devices of the sequence set of the random access preamble through system information, e.g., an SIB. Here, each cell may transmit a cell-specific offset used for frequency hopping or an initial offset value to the wireless devices. Such transmission may be performed through system information, e.g., an SIB.

In a resource mapping method, the randomization effect may be considered to be reduced when the same pattern is used for each cell. The effect of randomizing inter-cell interference may be expected by avoiding PRACH signals (e.g., random access preambles) according to the single-tone transmission method from colliding between cells, and by allowing only some of the PRACH signals (e.g., random access preambles) to collide if it is difficult for all the PRACH signals to avoid collision. To this end, a frequency hopping method or a resource mapping method for a PRACH signal (e.g., a random access preamble) according to the single-tone transmission method may be set independently for each cell. In the methods, (1) a wireless device may generate a single frequency hopping pattern or resource mapping pattern or a plurality of frequency hopping patterns or resource mapping patterns for each cell using a physical cell ID, identification information on a cell performing an NB-IoT operation, or a seed value signaled through a higher-layer signal. Alternatively, (2) a network may adjust information on a frequency hopping pattern or a resource mapping pattern (which may be pattern information itself or a parameter used to generate a pattern) to be used for each cell between cells and may transmit the information to a wireless device. Such transmission may be performed through system information, e.g., an SIB.

A unit for performing frequency hopping may be (1) a unit for transmitting a PRACH signal (e.g., a random access preamble) mapped according to the single-tone transmission method. Alternatively, to achieve the desired cell coverage radius of a BS, a unit for performing frequency hopping may be (2) a group of a plurality of transmission units mapped by a specific frequency difference. Specifically, the group of the plurality of transmission units may be a group of two consecutive transmission units adjacent to each other on the frequency axis. Alternatively, a unit for performing frequency hopping may be a group of a plurality of subcarrier indexes. For example, a unit for performing frequency hopping may be a group of subcarriers corresponding to {0, 1, 6, 7} from a reference subcarrier index. Alternatively, to secure the length of a sequence of a random access preamble, a unit for performing frequency hopping may be (3) a plurality of transmission units mapped to the same frequency. Particularly, in a frequency-selective channel, a sudden frequency change between transmission units by frequency hopping may dilute sequence characteristics of a random access preamble or may act as an obstacle to detection performance. In addition, when a PRACH signal (e.g., a random access preamble) is repeatedly transmitted, the PRACH may be randomized on the time axis in addition to hopping between frequencies for inter-cell randomization. In this case, (4) the time at which frequency hopping is performed may be changed over time on the basis of a pseudo random sequence. The sequence may be generated on the basis of a physical cell ID, identification information on a cell performing an NB-IoT operation, or a seed value signaled through a higher-layer signal.

Meanwhile, a unit for performing hopping may be independently set according to the coverage extension (CE) level. Alternatively, when a unit for performing hopping is preset, the number of transmission units for a PRACH signal (e.g., a random access preamble) may be designated according to a coverage extension level or a repetition number for a PRACH signal (e.g., a random access preamble) or a method for configuring a unit for performing hopping (e.g., by how many transmission units hopping is performed) may be set for each coverage extension level through a higher-layer signal.

A frequency region for performing frequency hopping may be (1) the entire frequency region (single narrow band or a plurality of narrow bands) in which NB-IoT operates. Alternatively, a frequency region for performing frequency hopping may be limited to (2) a frequency region set through a higher-layer signal. By limiting the frequency region, PUCCH/PUSCH transmission for other wireless devices may be allowed in the same NB-IoT band (narrowband). Specifically, a frequency region for transmitting a PRACH may be set differently according to the coverage extension level.

Specific examples of a frequency hopping pattern will be described below.

In a first example, frequency hopping is performed between hopping units by a bandwidth set in advance or through a higher-layer signal in a particular frequency region. A frequency change range may be limited within a particular time period. Thus, it may be considered to apply a sequence of a random access preamble with a certain length or longer to a PRACH according to the single-tone transmission method. Specifically, for example, when the transmission of a PRACH signal (e.g., a random access preamble) according to the single-tone transmission method is started with a frequency position f set to f1, a frequency position f at the next timing may be hopped in the form of f+delta or f-delta on the basis of the previous frequency position f.

In a second example, resource mapping for a hopping unit is performed with respect to a plurality of frequencies set in advance or through a higher-layer signal in a particular frequency region.

In a third example, frequency hopping between hopping units is performed in a particular pattern within a particular frequency region. The pattern may be a pseudo random sequence that is set using a transmission time (e.g., a subframe index or a symbol index) and/or a physical cell ID and/or a hopping seed as parameters. The following equation illustrates a specific example of a hopping pattern, where n_Vsc denotes the index of a transmission frequency for a PRACH signal (e.g., a random access preamble) before hopping, n_offset denotes a start offset of a PRACH transmission band in an NB-IoT band, and n_Psc (i) denotes the index of a frequency in a hopping unit at symbol point i. f_hop (−1) may be set to 0, and c (k) may be a pseudo sequence, in which an initial seed value may be set using a physical cell ID and/or a hopping seed as parameters. N_sc denotes the number of subcarriers in the PRACH transmission band.

In a fourth example, frequency hopping between hopping units is performed in a particular pattern within a particular frequency region. The particular frequency region in which a PRACH signal (e.g., a random access preamble) is transmitted may be divided into a plurality of sub-regions (either in advance or via a higher-layer signal). First hopping is frequency hopping between sub-regions according to a first pattern, while second hopping is frequency hopping between subcarriers in a sub-region according to a second pattern. The first pattern and the second pattern may be independently set. In a more specific example, the first pattern is a pseudo random sequence-based pattern as illustrated in the third example, which may change or select a sub-region. The second pattern may be a form of performing mirroring (for example, 0, 1, 2, and 3 is converted into 3, 2, 1, and 0, respectively). Assuming that a subcarrier spacing for a PRACH signal is 3.75 kHz, one sub-region may include four subcarriers.

Figure 14:
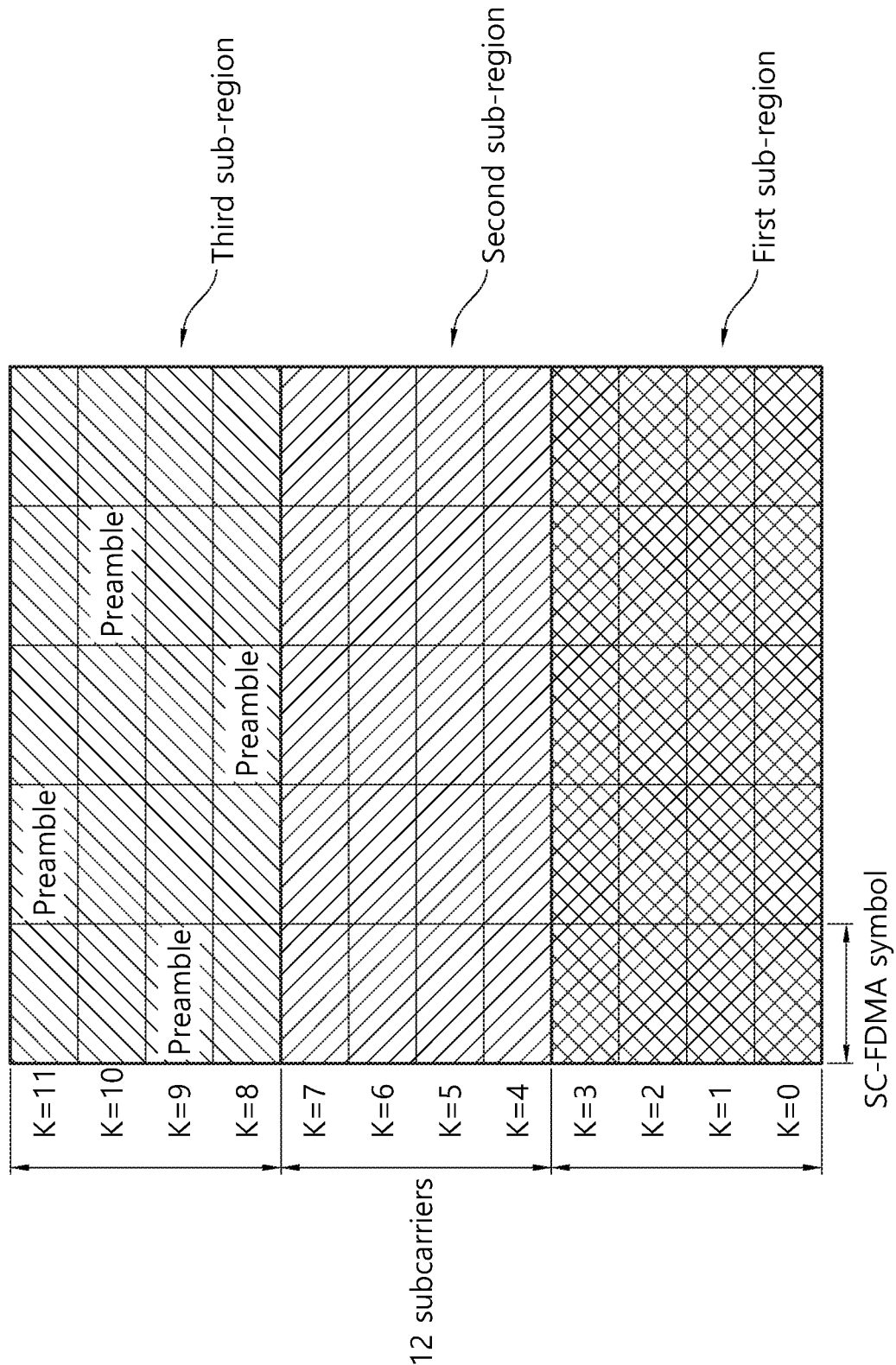
FIG. 14 illustrates a fourth example among a plurality of examples of a third embodiment of the present specification.

FIG. 14 illustrates a fourth example among a plurality of examples of the third embodiment of the present specification.

As illustrated in FIG. 14, 12 subcarriers may be divided into a plurality of sub-regions. For example, a first sub-region may include four subcarriers with a subcarrier index k ranging from 0 to 3, a second sub-region may include four subcarriers with a subcarrier index ranging from 4 to 7, and a third sub-region may include four subcarriers with a subcarrier index ranging from 8 to 11. The number of subcarriers included in the sub-regions may be set in advance or through a higher-layer signal. In addition, the position of a subcarrier at which each sub-region starts, that is, a subcarrier index or offset, may also be set in advance or through a higher-layer signal.

First hopping may be selecting one of the plurality of sub-regions and hopping to a frequency. Second hopping may be performing frequency hopping between subcarriers in the selected sub-region. That is, as illustrated in FIG. 14, the first hopping may be hopping to a frequency in the third sub-region. The second hopping may be hopping to a subcarrier within the third sub-region. The second hopping may be performed every symbol. That is, the second hopping may be performed every symbol i.

The following equation illustrates a specific example of a hopping pattern, where n_Vsc denotes the index of a transmission frequency for a PRACH signal (e.g., a random access preamble) before hopping, n_offset denotes a start offset of a PRACH transmission band in an NB-IoT band, and n_Psc (i) denotes the index of a frequency in a hopping unit at symbol point i. f_hop (−1) may be set to 0, and c (k) may be a pseudo sequence, in which an initial seed value may be set using a physical cell ID and/or a hopping seed as parameters. N_sc denotes the number of subcarriers in the PRACH transmission band.

[Equation 1]

$$\tilde{n}_{Psc}(i) = (\tilde{n}_{Vsc} + f_{hop}(i)) \bmod(N_{sc})$$

$$f_{hop}(i) = \left(f_{hop}(i-1) + \left(\sum_{k=i\cdot10+1}^{i\cdot10+9} c(k) \times 2^{k-(i\cdot10+1)}\right) \bmod(N_{sc}-1) + 1\right) \bmod N_{sc}$$

$$\tilde{n}_{Vsc} = n_{Vsc} - n_{offset}$$

$$n_{Psc}(i) = \tilde{n}_{Psc}(i) + n_{offset}$$

$$\tilde{n}_{Psc}(i) = (\tilde{n}_{Vsc} + f_{hop}(i)N_{sc}^{sb} + ((N_{sc}^{sb} - 1) - 2(\tilde{n}_{Vsc} \bmod N_{sc}^{sb}))f_m(i)) \bmod (N_{sc}^{sb}N_{sb})$$ [Equation 2]

$$f_{hop}(i) = \left( f_{hop}(i-1) + \left( \sum_{k=i\cdot10+1}^{i\cdot10+9} c(k) \times 2^{k-(i\cdot10+1)} \right) \bmod (N_{sc} - 1) + 1 \right) \bmod N_{sc}$$

$$f_m(i) = c(10\ i)$$

$$\tilde{n}_{Vsc} = n_{Vsc} - n_{offset}$$

$$n_{Psc}(i) = \tilde{n}_{Psc}(i) + n_{offset}$$

The above hopping pattern may be independently set for each coverage extension level. Here, a parameter (e.g., the delta in the first example, the hopping seed in the second example, or the like) set through a higher-layer signal may be set for each coverage level. Alternatively, a coverage extension level or a repetition number may be used in setting a hopping pattern. Specifically, as an initial seed for a hopping pattern, a physical cell ID and a hopping seed may be simultaneously considered. An example for simultaneous consideration may be aggregating the physical cell ID and the hopping seed.

The index of the first or last subcarrier for a PRACH according to the single-tone transmission method may be randomly selected by a wireless device. Specifically, the index of the first or last subcarrier for the PRACH in the case where the size of a scheduled message (i.e., Msg3) transmitted in response to a random access response is greater than a threshold value set in advance or via a higher-layer signal (e.g., an SIB) and/or path loss is smaller than a threshold value determined by a combination of parameters signaled in advance or via a higher-layer signal (e.g., an SIB) may be different from that in other cases. Likewise, a transmission method (e.g., a multi-tone transmission method or a single-tone transmission method) for Msg3 may be subsequently determined depending on the index of a representative or first subcarrier for PRACH transmission according to the single-tone transmission method. The PRACH according to the single-tone transmission method may be limited to a PRACH transmitted last. When code division multiplexing (CDM) is supported in PRACH transmission according to the single-tone transmission method, the index of the random access preamble may be considered along with the index of the subcarrier. For example, a plurality of groups may be created on the basis of a combination of a subcarrier index and a random access preamble index. Then, the wireless device may select a group according to the above conditions and may then randomly select a subcarrier index and a random access preamble index separately or as a combination from the group.

When a PRACH signal (e.g., a random access preamble) according to the single-tone transmission method is triggered by a (NB-) PDCCH command (order), DCI in the (NB-) PDCCH command may include the position of the first or last subcarrier for transmitting a PRACH according to the single-tone transmission method. Accordingly, the wireless device may transmit a PRACH signal (e.g., a random access preamble) according to the single-tone transmission method using the position of the subcarrier. A set of subcarrier positions to be indicated by the PDCCH command may also be set via a higher-layer signal separately from a contention-based PRACH. Alternatively, a frequency region for transmitting a PRACH may be set separately.

Meanwhile, it may be expected that channel conditions are similar in a sequence of one random access preamble, and thus a hopping pattern needs to be considered in mapping a sequence of a random access preambles across a plurality of PRACH resources. For example, when there is a plurality of groups of frequency regions for transmitting a PRACH signal, a sequence of a random access preamble may be generated and mapped for each group. Specifically, when a PRACH signal is repeatedly transmitted between frequency f1 and frequency f2, a sequence of a first random access preamble may be generated and mapped for a resource at frequency f1, and a sequence of a second random access preamble may be generated and mapped for a resource at frequency f2.

Information on the time (for example, a subframe index or a symbol index) at which transmission of a PRACH signal according to the single-tone transmission method can start may be specified through an SIB and may be set independently of a coverage extension level.

Figure 15:
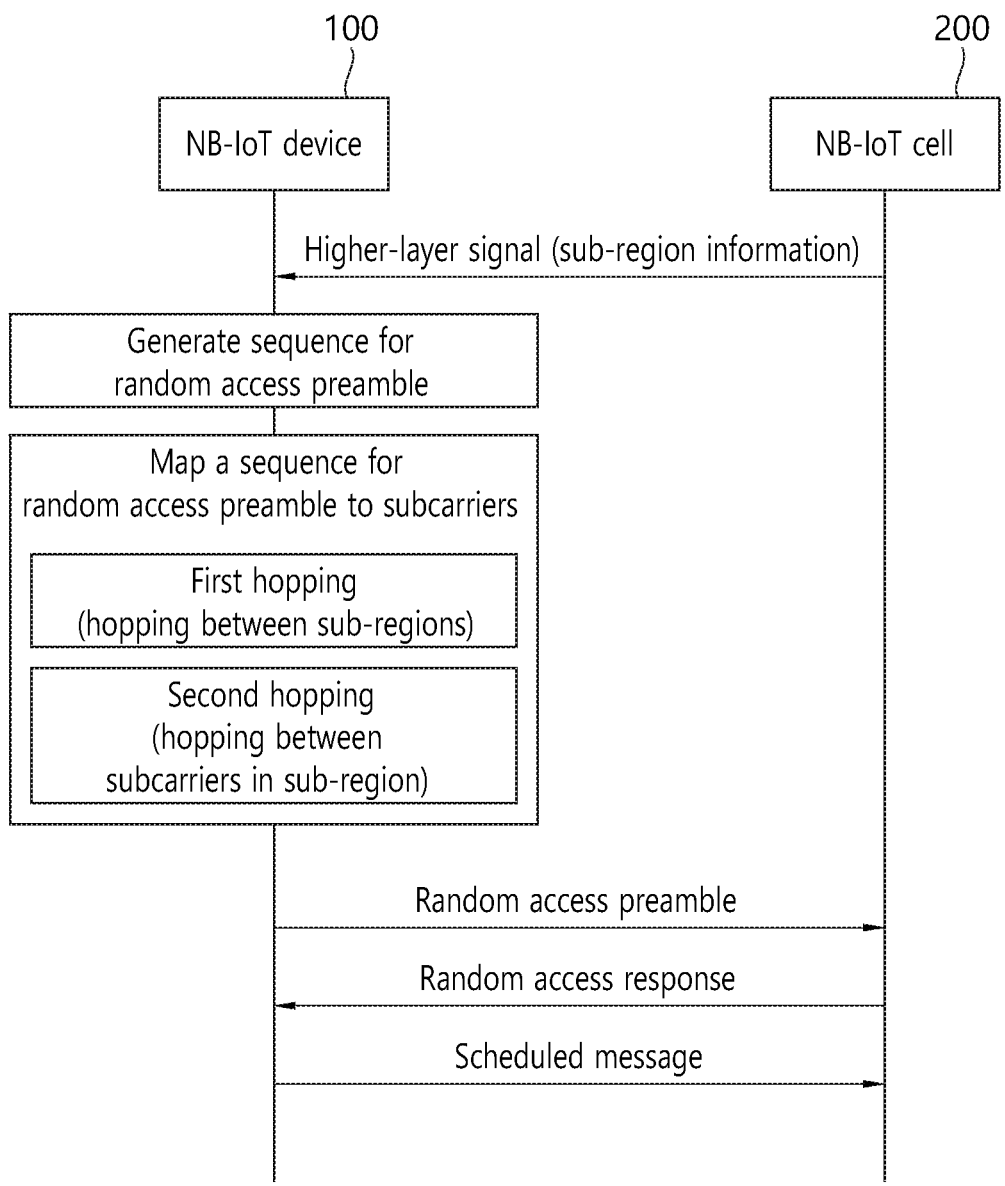
FIG. 15 is a flowchart illustrating the operation of a wireless device according to the fourth example of the third embodiment of the present specification.

FIG. 15 is a flowchart illustrating the operation of a wireless device according to the fourth example of the third embodiment of the present specification.

Referring to FIG. 15, an NB-IoT cell 200 transmits sub-region information to a wireless device (e.g., an NB-IoT device) 100 via a higher-layer signal. As described above, the sub-region information may include one or more of the number of sub-regions, the number of sub-carriers included in a sub-region, a start offset, and a frequency index at symbol time i.

The wireless device (e.g., an NB-IoT device) 100 generates a sequence for a random access preamble. The sequence may be generated as described in Section I or III. For example, as described above, the wireless device (e.g., an NB-IoT device) 100 may generate the sequence for the random access preamble using a physical cell ID, identification information on a cell performing an NB-IoT operation, or a seed value signaled through a higher-layer signal.

Next, the wireless device (e.g., an NB-IoT device) 100 maps the sequence to an RE, i.e., a subcarrier. Frequency hopping may be performed during the mapping. The frequency hopping may be performed in two stages. Specifically, the wireless device (e.g., an NB-IoT device) 100 performs first hopping and second hopping. For the first hopping, the wireless device (e.g., an NB-IoT device) 100 may select one of a plurality of sub-regions and may then hop to the selected sub-region. Subsequently, for the second hopping, the wireless device (e.g., an NB-IoT device) 100 may perform frequency hopping between subcarriers in the selected sub-region. More specifically, for the second hopping, the wireless device (e.g., an NB-IoT device) 100 may select one of subcarriers in the selected sub-region and may hop to the selected subcarrier. Then, the wireless device (e.g., an NB-IoT device) 100 may map the sequence for the random access preamble to the selected subcarrier.

Subsequently, the wireless device (e.g., an NB-IoT device) 100 transmits the random access preamble. An example in which the random access preamble is mapped to the subcarrier may be the same as illustrated in FIG. 14.

IV. Fourth Embodiment: Setup of Random Access Preamble Sequence when CP Length and Symbol Length are Different In introducing a PRACH according to the single-tone transmission method in a next-generation system, it may be considered that a subcarrier spacing is, for example, 3.75 kHz. Further, a plurality of CP lengths may be introduced in the next-generation system depending on the desired cell coverage radius of a BS. In this section, it is assumed that the length of a CP is 266.67 s (the reciprocal number of 3.75 kHz) or 66.67 μs (the reciprocal number of 15 kHz).

The length of a symbol forming a PRACH according to the single-tone transmission method and the length of a CP may be different depending on the length of a CP or may be set to be the same. Phase discontinuity may be likely to occur as a symbol is changed. In order to prevent the occurrence of phase discontinuity, it may be considered to set a sequence for a random access preamble applied to each symbol of a PRACH differently depending on the length of a CP. For example, when the length of a CP is 266.67 μs, which is the same as the length of a symbol for a PRACH signal on the basis of a subcarrier spacing of 3.75 kHz, phase continuity is guaranteed depending on a symbol switch even though a sequence for a random access preamble is configured entirely with a value of 1. However, when the length of a CP is 66.67 μs, the length of the CP is different from the length of a symbol, and thus a PRACH transmission unit (unit including a CP and a plurality of symbols) is changed. Accordingly, phase discontinuity may occur in the previous unit and at the start point of each CP. Whether the phase is continuous may be a factor that may affect complexity in configuring a BS and/or a wireless device. In PRACH transmission in the next-generation system, phase continuity can be guaranteed in at least a certain period.

In a specific embodiment, it may be considered that a sequence for a random access preamble is mapped to each group including one CP and a plurality of symbols (e.g., five symbols). That is, individual symbols in a group may be mapped to the same value, and symbols in a different group may be mapped to a different value. It is assumed that the length of the CP is 66.67 μs (or 2048 T_s), a subcarrier spacing is be 3.75 kHz, and the index of a hopping subcarrier mapped to each group is k0, k1, k2, and the like. In this case, the sequence for the random access preamble for each group may include a value determined by a function of the index of a subcarrier to be mapped to the group. For example, the sequence for the random access preamble to be mapped to each group may have the following form.

1,exp(j2*pi*k1/4),exp(j2*pi*(k1+k2)/4),exp(j2*pi*(k1+k2+k3)/4), . . . ,exp(j2*pi*Sum_{i=1 to n−1}(k_i)/4), . . . .

Values in each sequence may be repeated in order such that 1 is mapped to all symbols of the first group and the next value is mapped to all symbols of the next group. The sequence for the random access preamble is merely an example, and another sequence for a random access preamble configured to satisfy phase continuity may be extended from the idea of the present invention. For example, setting a different sequence for each cell may be considered in order to randomize inter-cell interference. In this case, a sequence may be generated using a cell ID or an NB-IoT cell ID. The sequence for the random access preamble may be reset after a certain period or at a particular time to start from 1. A criterion for resetting may be a plurality of subframes in the form of a multiple of four, a single radio frame, or a plurality of radio frames.

The aforementioned embodiments of the present invention can be implemented through various means. For example, the embodiments of the present invention can be implemented in hardware, firmware, software, combination of them, etc. Details thereof will be described with reference to the drawing.

Figure 16:
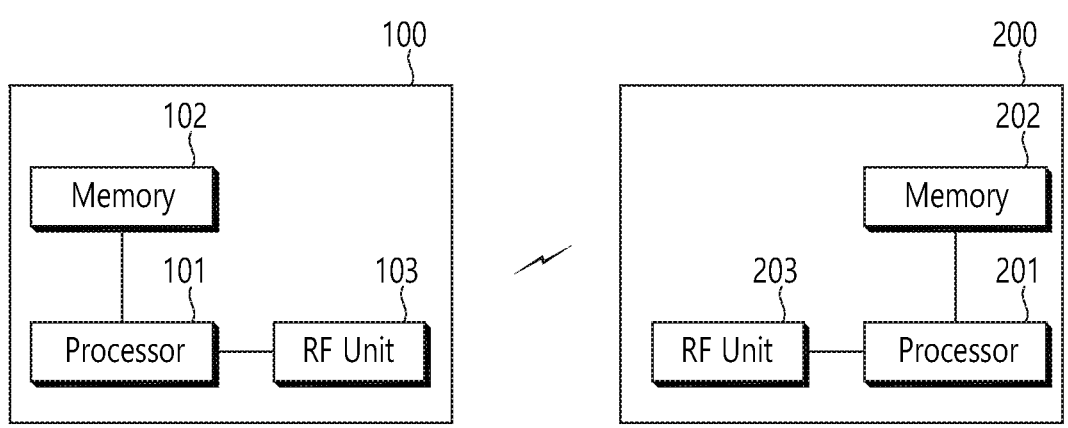
FIG. 16 is a block diagram illustrating a wireless communication system to implement embodiments of the present specification.

FIG. 16 is a block diagram illustrating a wireless communication system to implement embodiments of the present specification.

A BS 200 includes a processor 201, a memory 202, and a transceiver (or radio frequency (RF) unit) 203. The memory 202 is coupled to the processor 201 and stores various pieces of information for driving the processor 201. The transceiver (or RF unit) 203 is coupled to the processor 201 and transmits and/or receives a radio signal. The processor 201 implements the proposed functions, procedures, and/or methods. In the aforementioned embodiment, an operation of a BS may be implemented by the processor 201.

A wireless device (e.g., an NB-IoT device) 100 includes a processor 101, a memory 102, and a transceiver (or RF unit) 103. The memory 102 is coupled to the processor 101 and stores various pieces of information for driving the processor 101. The transceiver (or RF unit) 103 is coupled to the processor 101 and transmits and/or receives a radio signal. The processor 101 implements the proposed functions, procedures, and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a random access preamble, the method performed by a wireless device and comprising:
    performing a single tone transmission of the random access preamble,
    wherein the single tone transmission of the random access preamble uses a 3.75 kHz subcarrier spacing and includes:
    generating a sequence of the random access preamble;
    mapping the sequence of the random access preamble onto one subcarrier among 12 subcarriers in a frequency domain; and
    transmitting the sequence of the random access preamble which is mapped onto the one subcarrier;

wherein the mapping of the sequence of the random access preamble includes:
performing a first hopping among plural groups, each of which includes a pre-configured number of subcarriers, and
performing a second hopping among the pre-configured number of subcarriers in one group of the plural groups.

2. The method of claim 1, wherein the performing of the first hopping comprises:
selecting one group among the plural groups; and
performing a hopping into the selected group.

3. The method of claim 2, wherein the performing of the second hopping comprises:
selecting one subcarrier among plural subcarriers included in the selected group;
performing the hopping into the selected subcarrier; and
mapping the sequence of the random access preamble onto the selected subcarrier.

4. The method of claim 1, further comprising:
receiving information on one or more of the plural groups via a higher layer signal.

5. The method of claim 4, wherein the information on one or more of the plural groups received via the higher layer signal includes
information on the pre-configured number of the subcarriers included in each group.

6. The method of claim 5, wherein the information on one or more of the plural groups received via the higher layer signal includes
information on a frequency offset.

7. The method of claim 1, wherein the sequence of the random access preamble is generated based on an identifier of a narrowband internet of things (NB-IoT).

8. The method of claim 1, further comprising:
receiving a physical downlink control channel (PDCCH) order for triggering a transmission of the random access preamble.

9. The method of claim 8, wherein the PDCCH order includes
downlink control information (DCI) including information on the subcarrier on which the random access preamble is transmitted.

10. A wireless device for transmitting a random access preamble, the wireless device comprising:
a transceiver; and
a processor configured to control the transceiver and configured to:
perform a single tone transmission of the random access preamble,
wherein the single tone transmission of the random access preamble uses a 3.75 kHz subcarrier spacing and includes:
generating a sequence of the random access preamble;
mapping the sequence of the random access preamble onto one subcarrier among 12 subcarriers in a frequency domain,
transmitting the sequence of the random access preamble which is mapped onto the one subcarrier;
wherein the mapping of the sequence of the random access preamble includes:
performing a first hopping among plural groups, each of which includes a pre-configured number of subcarriers, and
performing a second hopping among the pre-configured number of subcarriers in one group of the plural groups.

11. The wireless device of claim 10, wherein for performing the first hopping, the processor is further configured to:
select one group among the plural groups; and
perform a hopping into the selected group.

12. The wireless device of claim 11, wherein for performing the second hopping, the processor is further configured to:
select one subcarrier among plural subcarriers included in the selected group;
perform the hopping into the selected subcarrier; and
map the sequence of the random access preamble onto the selected subcarrier.

13. The wireless device of claim 10, wherein the transceiver is configured to:
receive information on one or more of the plural groups via a higher layer signal.

14. The wireless device of claim 10, wherein the transceiver is configured to:
receive a physical downlink control channel (PDCCH) order for triggering a transmission of the random access preamble.

15. The wireless device of claim 14, wherein the PDCCH order includes
downlink control information (DCI) including information on the subcarrier on which the random access preamble is transmitted.

* * * * *